United States Patent [19]
Deuzeman et al.

[11] 3,932,334
[45] Jan. 13, 1976

[54] CALCIA CATALYZED RESINS

[76] Inventors: Hendrik H. J. Deuzeman; Norman Lumley; Ruben A. Santos, all of P.O. Box 3005, Sarnia, Ontario, Canada

[22] Filed: Mar. 21, 1974

[21] Appl. No.: 453,646

Related U.S. Application Data

[63] Continuation-in-part of Ser. No. 400,145, Sept. 24, 1973, abandoned, Continuation-in-part of Ser. No. 226,265, Feb. 14, 1972, abandoned, Continuation-in-part of Ser. No. 44,616, June 8, 1970, abandoned, Continuation-in-part of Ser. No. 226,234, Feb. 14, 1972, abandoned.

[52] U.S. Cl. ......... 260/29.3; 260/29.4 R; 260/57 R; 260/839; 260/840
[51] Int. Cl. ............................................ C08g 51/24
[58] Field of Search ......... 260/29.3, 57 C, 57 R, 60, 260/29.4 R, 839, 840

[56] References Cited

UNITED STATES PATENTS 2,758,101 8/1956 Shappell ........................... 260/29.3

*Primary Examiner*—Lorenzo B. Hayes
*Attorney, Agent, or Firm*—Stevens, Davis, Miller & Mosher

[57] ABSTRACT

This specification discloses ecologically desirable, improved binder compositions suitable for bonding fibers. These binders exhibit low pollutant characteristics and improved properties, due to a combination into the binder of aminoplast resins or non phenolic monomeric materials capable of co-condensing with formaldehyde, together with a substantially phenol free, low mono methylolphenol high ortho para di methylol phenol content, water soluble thermosetting phenol formaldehyde resole solution. The phenolic resole resin is made to conform to the desired composition by mixing together a high mole ratio of formaldehyde with phenol and calcium hydroxide with cooling so that very little reaction takes place. The reaction is then allowed to proceed according to a carefully controlled temperature-time cycle without external heat input until substantially all the phenol has reacted to form condensation products and yet the mixture is still infinitely dilutable with water. Such binder compositions may be applied at solids levels of 1% to 80% and contain much lower phenolic resin component than binders of prior art with similar bonding characteristics.

22 Claims, No Drawings

CALCIA CATALYZED RESINS

CROSS REFERENCE TO RELATED APPLICATIONS

This application is a continuation-in-part of both (1) application Ser. No. 400,145, filed Sept. 24, 1973, now abandoned, which was a continuation of application Ser. No. 226,265, filed Feb. 14, 1972, now abandoned, which was a continuation-in-part of application Ser. No. 44,616, filed June 8, 1970, now abandoned; and (2) application Ser. No. 226,234, filed Feb. 14, 1972, now abandoned, which was a continuation-in-part of application Ser. No. 44,616, filed June 8, 1970, now abandoned.

This invention relates to the preparation of substantially phenol-free water soluble thermosettable phenol formaldehyde resol solutions, to the preparation of binder compositions therefrom and to fibre articles such as glassfibre insulating products so bonded.

Phenol formaldehyde resole resins are well known in the art. There also exists prior art pertaining to the preparation and use of these and other resins, monomers and other additives in binder compositions for the bonding of fibre products. Binder systems from such resoles, for example for glass fibres, usually comprise, in addition, also substantial percentages of co-condensable monomers and polymers, e.g. urea, and urea formaldehyde resins and the more costly dicyandiamide and melamine formaldehyde resins, along with other ingredients such as mineral oil, emulsifiers and stabilizers. Such binders are applied to glass fibres at high temperatures, as dilute aqueous dispersions or solutions. Similar compositions are used for bonding different materials, such as wood fibre or chip products, plywood and paper laminates. Those skilled in the arts are making continuing great efforts to optimize resole resins for use in bonding compositions.

For use in binders for glass fibres, prior art resins suffer from some combination of the following properties which limit their usefulness for this end use:

The solubility in water (considered in terms of dilutability) or in other binder ingredients may be limited and lead to blockage of lines, filters, and spray nozzles, etc.

The stability in storage before conversion into a binder is inadequate.

The resin may contain excessive unreacted phenol which is steam volatile and escapes to the atmosphere during binder applications to the fibres and necessitating expensive pollution control equipment to eliminate it and to dispose of the waste.

The resin contains volatile phenol alcohols (mono methylol phenols) which can escape to atmosphere during application, forming stable aerosols which are difficult to eliminate and necessitate further pollution control equipment to eliminate them and to dispose of the wastes.

The cured bonding material may contain water soluble alkali metal salts derived from the catalyst used to promote the methylolation reaction. Such alkali metal salts are detrimental to bond strength retention and promote corrosion where glass fibre products are used in contact with common metals.

The cost of the phenol formaldehyde resin produced may be excessive due to composition, catalyst cost and low resinification efficiency, i.e.: low yield of organic resin solids per unit volume charged or per unit of reactor time and volume.

The ratio of resin or binder solids which is retained in the finished product to those applied (application efficiency) is inadequate. Application efficiency is related to and simulated by the volatility test known as "Cone Efficiency".

The resistance of the cured binder to glass bond under conditions of high moisture and/or high temperature is inadequate.

The phenol formaldehyde resol may not be fully compatible with other desirable binder components.

The resoles and binder compositions of the present invention exhibit an advantageous balance of properties based on the above criteria and offer material advantages over prior art resins. These advantages have been demonstrated convincingly by large scale industrial use of said substantially phenol free, high mole ratio, calcium catalysed phenol formaldehyde resoles in binders for glass fibers. It is expected said resoles would perform satisfactorily in binders for laminated paper and wood products and the like with similar advantages.

Said advantages are principally:

a. An ecologically desirable reduction in atmospheric pollution during curing due to the very low phenol and monomethylolphenol content of the resole resin. These two toxic substances are steam volatile and escape to the atmosphere during the manufacturing process and elimination of such pollution is a great benefit.

b. A further reduction in pollution due to using a lesser proportion of phenolic resole in the bonding solids. This is possible because the high mole ratio permits an increase in non phenolic film forming materials.

c. A further reduction in pollution due to higher yields of cured resin solids from the applied binder.

d. An improvement in the case of control of the resole manufacturing process, particularly significant in relation to continuous production techniques.

e. An improvement in the stability of the resole and binders made from it.

Discussion of the Prior Art

The extensive prior art on water soluble phenolic resoles does not disclose any process to give these benefits.

Consider the vary low phenol and low monomethyol phenol obtained by this process. In U.S. Pat. No. 2,940,954, June 14, 1960, Barr et al have worked on this problem and disclose a process for obtaining low values by solvent extraction. They indicate that a resole made with a mole ratio of 3 moles formaldehyde to 1 mole phenol combined with an alkaline catalyst by the recognised methods known to those skilled in the art would analyse to show 3% unreacted phenol and 10% or more monomethylolphenol at the end of the reaction (column 3, lines 28 to 64).

In Canadian Pat. No. 658,438, Feb. 26, 1973, Smucker disclose reaction of phenol with formaldehyde and barium hydroxide catalyst until substantially all the phenol is reacted. However, such a mixture is not stable unless the resole is immeditely converted to a terpolymer resin based on phenol formaldehyde, urea, dicyandiamide, and melamine and the resole itself cannot be obtained phenol free for use in binder compostions. Even when converted to a terpolymer the resins of the Smucker process do not show the stability of resins of this invention.

High mole ratio resins are disclosed in a number of prior art patents. For instance Gladney and Deuzeman U.S. Pat. No. 3,624,274 Nov. 30, 1971, shows resins with mole ratios of 1.9 to 2.8 mols formaldehyde per mole of phenol. (1.9–2.8:1). Whetstone U.S. Pat. No. 2,441,860, May 18, 1948 shows mole ratios from 1.0:1 to 4.0:1. Higashi U.S. Pat. No. 2,862,910 Dec. 2, 1958 shows mole ratios 0.8:1 to 3.0:1. LeBlanc U.S. Pat. No. 3,304,345, shows ratios 1.0:1 to 4.0:1. Monsanto Pat. U.K. Pat. No. 1,023,881, Lambuth shows mole ratios 2.2:1 to 3.5:1. Monsanto Pat. U.K. Pat. No. 733,568 shows mole ratios 2.25:1 to 3.33:1.

The use of phenolic resoles as sole binding agent for glass fibres is restricted effectively to resoles with a formaldehyde to phenol mole ratio of 2.6:1. Resoles with higher mole ratios do not develope adequate bond strength, and have therefore not been used in glass binder composition. It was a surprising and novel discovery to find that the addition of other co-condensable materials such as urea, dicyandiamide and the like to these high mole ratio resins in the range 2.8:1 to 4.5:1 and especially 3.2:1 to 4.4:1 mols formaldehyde per mol phenol restored the bond strength to an acceptable level, and that good quality glass binders can be produced based on such high mole ratio resins.

The use of calcium as a catalyst is described in the art as examplified by Gladney U.S. Pat. No. 3,624,247, LeBlanc U.S. Pat. No. 3,304,345, Monsanto U.K. Pat. No. 1,023,881, and Monsanto U.K. Pat. No. 733,568. Alkaline earths are described as catalyst in patents such as Whetstone U.S. Pat. No. 2,441,860 and Smucker Canadian Pat. No. 658,438. All these patents make a general assumption that one alkaline catalyst is equivalent to another and indeed interchangeable for resole production and that the reaction rate and resulting composition depend on the hydroxyl concentration (based on the phenol present).

A detailed study of the catalysis of mixtures of phenol and formaldehyde by calcium hydroxide has shown that this assumption is incorrect. There are considerable differences in composition depending on the specific catalyst used, and also on the mole ratio of formaldehyde to phenol.

It is found that use of calcium as a catalyst results in:

a. Preferential conversion of more formaldehyde to organic resin solids, which increases resinification efficiency.

b. Formation of a higher quantity of O,P-dimethylol phenol which is a desired product.

c. An increase in yield as shown by cone efficiency tests.

d. A reduction in the content of monomethylol phenol, diphenyls and trimethylol phenol.

The properties of the resole catalysed by calcium are modified as a result of this change in composition so that it is feasible to allow the condensation to proceed until no free phenol is detectable and yet the resole is still infinitely dilutable with water and remains so for a sufficiently long period to allow cooling to about 70°F and still be infinitely dilutable. This behaviour due to the use of calcium is novel and unexpected and not disclosed in or deducible from the prior art.

To take advantage of the ability to react to such low phenol and monomethylol phenol as a practical day to day process demands a high degree of uniformity of operation in manufacture.

The patents mentioned above in discussion of prior art with regard to mole ratio and catalyst all call for heating to promote the reaction. It is a particularly novel feature of this invention that the conditions specified mean that it is not necessary to supply heat from an external source to bring about reaction. Using these high mole ratios of formaldehyde to phenol and calcium oxide or hydroxide as a catalyst with the water content restricted to no more than 6–10 moles per mole of reactants it is found that the reaction can be controlled by cooling only.

Against this general background of modern resin, binder and glass fibre technology, of the environmental control requirements and of the constraints inherent in the art of preparing water soluble thermosettable resin compositions for the bonding of glass fibres, some major objectives of this invention are set out herein:

a. To reduce the emission of phenolic or other organic pollutants to the atmosphere by reducing the content of volatile compounds which become pollutants, per unit of aqueous thermosettable phenol formaldehyde resol.

b. Further reduce pollution by reducing the proportions of phenolic resol used in binder compositions for bonding glass.

c. To retain infinite dilutability of the resol with distilled water, by minimizing the formation of water insoluble condensation products, such as for instance higher phenyls.

d. To react all available phenol (B.P. = 181°C) in the condensation reaction and minimize the formation of o-monomethylol phenol (= $\alpha$,2-dihydroxy toluene or Saligenin; which sublimates at 100°C); and p- monomethyl phenol (= $\alpha$,4-dihydroxy toluene, B.P. = 252°C); which are volatile per se or in the presence of steam.

e. To prepare such aqueous phenolic resins in batch type or continuous operation, requiring no after treatment for reduction of the volatiles by secondary treatment, e.g. by distillation or solvent extraction.

f. To retain a moisture resistant non-corrosive bond between glass fibre and heat cured binder.

g. To minimize the amount and settling characteristics of any insoluble product of catalyst neutralization.

h. It was a major objective of the work leading to this invention to introduce the catalyst in suitable proportions so as to create a high enough exotherm to carry the reaction to completion without input of external heat, controlling temperatures throughout the cycle by cooling only. The purpose is twofold. In industrial reaction vessels it has been observed that advanced, water insoluble condensation products are formed on batch-type heating surfaces (coils, jackets), and at least in part are released into the resin cook. Secondly, it is very desirable for effective reaction control in a continuous process for the manufacture of water soluble, aqueous phenol formaldehyde resins of the type here described, that temperature control be restricted to the cooling mode.

i. To dissolve all catalysts without residue.

j. To produce a material in which any resulting insoluble neutralization products of alkaline earth metal catalysts are substantially non-settling and non-agglomerating, and have little or no tendency to block pipe lines.

k. To reduce the content of soluble alkali metal salts, and particularly alkali metal chlorides, so they contribute not more than 1.8% of $R_2O$ (R=Na, K or other alkali metal) to the binder composition.

1. To obtain a moisture resistant non-corrosive bond to glass fibres. This precludes the use of such phenolic resins derived from catalyzation with high concentrations of hydroxides or salts of alkali metals, as are disclosed in British Pat. No. 1,023,881 Monsanto, published Mar. 30, 1966.

The data from our experimentation undertaken to meet or to approach the above objectives and constraints suggested that for the preparation of co-condensable thermosetting bonding materials from phenol formaldehyde, amine type monomers and/or amine formaldehyde condensation products, the phenol formaldehyde resole component might tolerate a relatively high percentage of unreacted formaldehyde. Thus it could be prepared from unusually high formaldehyde mole ratio charges, even though the prior art indicates clearly that detrimental effects of such high mole ratios upon the aging and weathering properties of the cured phenolic resin per se are to be expected.

In the art of making binders for bonding glass fibres the use of previously known phenolic resins as sole binder material was restricted effectively to resoles with a formaldehyde to phenol mole ratio of 2.6:1. An increase of mole ratio results in a decrease in bond strength and at ratios of 3:1 the product is not a suitable bonding agent. It was therefore surprising and unexpected to find that high mole ratio resins in the range of 2.8 to 4.5 or especially 3.2 to 4.4 do form good binders in combination with other co-condensable monomers and polymers such as urea, dicyandiamide, urea formaldehyde resins, melamine formaldehyde resins, and other binder ingredients such as mineral oil, emulsifiers and stabilizers.

It appeared further advantageous to investigate high catalyst concentrations. The prior art teaches that inorganic alkaline catalysts for the condensation reaction of phenol with formaldehyde can be selected interchangeably from alkaline earth metal and alkaline metal hydroxides, oxides and salts of acids of dissociation constant not greater than $1.1 \times 10^{-2}$. In view of the objectives enumerated above it was taken into consideration that:

a. In the case of soda ($Na_2O$) or potassia ($K_2O$) catalyzed resins, neutralization with acids (hydrochloric, sulfuric or carbonic) forms soluble salts in the aqueous solution in quantities objectionable for the use of such resins, e.g. for bonding glass fibres. The need arises to de-ionize such resins by ion-exchange methods.

b. In the case of the use of barium hydroxide as catalyst, limitations are encountered in solubility, cost, and the properties of the neutralization product. Barium sulphate having a specific gravity of 4.5 must be precipitated ultra-fine in order to avoid settling during storage, or blockage of lines, filters, etc. Similarly, barium carbonate has a gravity of 4.3.

On the other hand, calcium sulphate and calcium carbonate have specific gravities of 2.9 and 2.8 respectively. These calcium salts resist settling in particle sizes as large as 1 to 2 microns, although they can be readily obtained in sub-micron size particles. Calcium oxide and hydroxide were found to be superior to the other catalysts. It is conveniently used in powdered form, but calcium hydroxide solutions can also be used subject to limitations in total water content of the reactants.

Within the parameters chosen by us and more closely spelled out below, we have found the following unexpected effects of catalyzation of the phenol formaldehyde reaction with calcium oxide or calcium hydroxide as compared to prior art resins, and as compared to high mole ratio resins catalyzed with comparable concentrations of sodium hydroxide or barium hydroxide:

preferential conversion of more formaldehyde to organic resin solids, thus increased resinification efficiency.
preferential formation of o-p-dimethylol phenol
increased cone efficiency
reduction in mono-methylol phenol content
reduced formation of diphenyls and of tri-methylol phenol
increased chemical stability and shelf life
increased bond strength to glass fibres, when combined with urea, or other amine monomers, or with amino plast resins, in binder compositions as described below.

The present invention therefore provides a method for making an infinitely dilutable low phenol aqueous solution of thermosettable phenol formaldehyde resin, by selectively catalyzing and controlling the methylolation of phenol with formaldehyde to increase resinification, minimize the content of monomethylol phenols and higher phenyls and maximize the content of o-p-dimethylol phenols, thus producing a resin solution component for binder formulations having low air and wash water-polluting characteristics when applied to a substrate, comprising the steps of (a) mixing U.S.P. phenol, in the absence of other monomers, with aqueous formaldehyde, in an amount of 2.8 to 4.5 of moles of formaldehyde per mol of phenol, and correspondingly up to about 10 moles of water per mol of the reactants, at a temperature not exceeding about 85°F, and (b) introducing calcium oxide or calcium hydroxide catalyst, with cooling in an amount of 3.5 to 7 percent as calcium (Ca) based upon the weight of phenol, (0.08 mol to 0.16 mol calcium (Ca) per mol of phenol), (c) controlling the exothermic rise in the temperature of the reactants without heat input so as to increase to not more than about 125°F during at least the first hour of reaction, (d) continuing the methylolation reaction without heat input at a suitable temperature up to 155°F, and (e) terminating said reaction by cooling when the condensation reaction product is substantially phenol-free, and is still water soluble.

In a further embodiment such a method for making infinitely dilutable substantially phenol free aqueous solutions of thermosettable phenol formaldehyde resins, by selectively catalyzing and controlling the methylolation of phenol with formaldehyde to increase resinification, minimize the content of monomethylol phenols and higher phenyls and maximize the content of o-p-dimethylol phenols, thus producing a resin solution component for binder formulations having low air and wash water polluting characteristics when applied to a substrate, comprising the steps of (a) mixing U.S.P. phenol, in the absence of other monomers, with aqueous formaldehyde in an amount of 3.2 to 4.4 moles of formaldehyde per mol of phenol, and correspondingly from 6 to 10 moles of water per mol of the reactants, at a temperature not exceeding about 85°F, and, (b) introducing calcium oxide or calcium hydroxide catalyst with cooling up to or near its solubility limit in the aqueous mixture present, catalyst in an amount of 3.5 to 7 percent as calcium (Ca) based upon the weight of phenol, (0.08 mol to 0.16 mol calcium (Ca) per mol of phenol), (c) controlling the exothermic rise in temperature of the reactants without heat input so as to increase to not more than about 125°F during at least the first hour of reaction, (d) continuing the methylolation reaction without heat input at a suitable temperature up to 155°F, and (e) terminating said reaction by cooling when the condensation reaction product is substantially phenol free, and is still water soluble.

The present invention further provides an aqueous solution of an infinitely dilutable thermosettable phenol formaldehyde condensation resin, said resin characterized as follows: (i) not over about 0.5% unreacted phenol by weight, (ii) between 3 to 16% unreacted formaldehyde, by weight, (iii) between 2.3 to 2.7 methylol groups per phenol molecule, (iv) low content of water insoluble higher phenyls, (v) low content of monomethylolphenol, said solution being prepared by selectively catalyzing and controlling the methylolation of 1 mol of phenol with 3.2 to 4.4 mols of formaldehyde with calcium oxide and no more than 10 mols of water per mol of reactant, to suppress the formation of monomethylol phenols and higher phenyls, and to favour the formation o-p-dimethylol phenol.

The temperature is preferably maintained not higher than about 85°F in step (a). The process may be batch or continuous, and there are several advantages in using this process in a continuous manner.

The phenol is introduced in the form of U.S.P. phenol, in the absence of monomers such as other (substituted) phenols as may be found in natural phenol, or such as amines, e.g. ureas, dicyandiamide, melamine, all of which can react competitively with the formaldehyde present, leading uncontrollably to indeterminate insoluble reaction products or to their precursors.

The formaldehyde is introduced in aqueous solution of 44% or more concentration, (containing no more methanol than 1% for stabilization). The formaldehyde is introduced in an amount of 2.8 to 4.5 or preferably 3.2 to 4.4 moles per mole of phenol. Most preferably it may be introduced in an amount of 3.5 to 4.0 mole per mole of phenol, and particularly in an amount of about 3.6 to 3.8 moles per mole of phenol. Water may be added to the reactants if the formaldehyde solution concentration exceeds 44%, to adjust the ratio of from 6 to 10 moles of water per mol of the reactants and preferably 6.5 to 10. This water may be added in the form of an aqueous solution of calcium hydroxide catalyst. If too little water is present heat evolution on catalyst addition may be excessive, and the selectivity of the substitution reaction suffers. Excess water will slow the reaction time down and may adversely affect the terminal composition.

The reactants, phenol and formaldehyde which are normally commercially stored at 140°F and 120°F respectively, are blended, while cooling to a temperature of no more than about 85°F, before addition of catalyst.

The catalyst addition is made under vigorous agitation and with cooling and at such a rate as to prevent premature condensation. Preferably the temperature is held no higher than about 85°F until all the alkaline catalyst is added. The cooling may be reduced to let the temperature rise without the use of an external heating source at such a rate that the temperature is no more than 125°F after one hour. Calcium oxide is preferred over calcium hydroxide catalyst when the reactor design has adequate cooling capacity to handle it successfully.

The calcium catalyst is added as CaO or as $Ca(OH)_2$. It is generally introduced in an amount approximating its solubility in the system. This will correspond to about 3.5 to 7 weight percent calcium based upon the weight of phenol, (0.08 to 0.16 mol $Ca(OH)_2$ per mol of phenol), preferably to 4.9 to 5.9 weight percent, 0.11 to 0.14 mol per mol of phenol and most preferably to 5.1 to 5.5% by weight of phenol, 0.12 to 0.13 mol per mol of phenol. The amount soluble will depend on the amount of water in the system.

The reaction may be carried out at any suitable temperature up to and preferably no higher than about 155°F and usually for a period of 3 to 10 hours. Higher temperatures encourage excessive co-condensation and the formation of insoluble products. The temperature is preferably to be reached from a charge temperature of not over about 85°F, either linearily or in a stepwise increase whereby a first temperature no higher than 125°F is maintained for at least approximately one hour. The condensation reaction is arrested by cooling to 100°F or preferably to 70°F either when the minimum content of free (unreacted) formaldehyde is attained or when minimum acceptable water dilutability is observed whichever may occur first. The minimum free formaldehyde values are related to the starting ratio of formaldehyde to phenol. Accordingly, they can range from approximately 4.5 weight percent attained with a mole ratio of 2.8:1 to approximately 14.0% for a mole ratio of 4.5:1 depending on the reaction temperatures and the operating characteristics of the reaction equipment.

It has been observed, that in calcium catalyzed resins as described here, presumably because of their low content of insolubles and insolubles precursors, the minimum constant free formaldehyde content can be attained safely before an unacceptable drop in dilutability occurs. It has been further observed that in contrast particularly to prior art sodium hydroxide catalyzed resins, the calcium catalyzed resins are less prone to proceed to insolubility if the reaction is continued (such as up to as much as half an hour) beyond the usual cut-off point. This observation is in keeping with the unusual storage stability of these resins.

Calcium catalyzed resins of this invention can but need not be neutralized for storage and subsequent use as binder ingredients. Binders based on the non neutralized resins have been tested successfully for large scale use. The neutralization of the catalyst with carbon dioxide gas, or alternate acids or acidic salts, is readily and preferably conducted in such a fashion that a micron or submicron size is formed which is non-settling, non-blocking in the resol solutions and in the binder compositions made therefrom.

EXAMPLES

The following examples are intended to exemplify the principles underlying the present invention and are not intended to be limiting in their scope.

The neutralized phenol formaldehyde resins produced in examples No. I to VII were sampled and several characteristics of these samples were tested, following test methods described further below.

The phenolic resins produced in these examples were then combined with other ingredients as disclosed further below to prepare aqueous thermo setting binders for bonding glass fibres.

EXAMPLE I

Laboratory preparation of a calcium oxide catalyzed resin of a

Charge Ratio: 2.8 MOL Formaldehyde per 1.0 Mol Phenol

Ingredients

| | | |
|---|---|---|
| Formaldehyde — | aqueous — 44% solution | 1995 gms |
| Phenol — | USP 98% | 1005 gms |
| Calcium Oxide — | Ashgrove Springfield high calcium pebble quicklime CaO 96.3% ground to (−10) mesh on U.S. standard scale | 50.7 gms (3.5% Ca) (based on weight of phenol) |

Procedure

The formaldehyde was placed in a 3 liter glass reactor. The agitator was started, phenol was added, and then calcium oxide was added. The temperature was allowed to rise to 125°F. in a period of about 1 hour. The temperature was held at 125°F. for 30 minutes. The temperature was allowed to increase to 150°F. in 30 minutes. The temperature was held at 150°F. until the free formaldehyde was reduced to 4.5% and then cooled to 75°F. The pH at the end of reaction was 8.70.

The resin was neutralized with carbon dioxide gas to a pH of 7.3 and sampled for tests.

Results

The properties and composition of the resin are shown in Table I, Example I.

EXAMPLE II

Industrial production of a calcium oxide catalyzed resin suitable for use in binders particularly, in varying combinations with urea.

Charge Ratio: 2.8 Mol Formaldehyde per 1.0 Mol Phenol

Batch Size: 2000 gals.

Ingredients

| | | |
|---|---|---|
| Formaldehyde — | aqueous — 44% solution | 1375 Imp. gals. |
| Phenol — | USP 98% | 743 Imp. gals. |
| Calcium oxide — | Beachville rotary crushed high calcium quicklime — CaO 92%— (−3) mesh on U.S. standard scale | 406 lbs. |

Procedure

The 3000 gals. reactor was charged with formaldehyde and phenol. The agitator was started. The catalyst (calcium oxide) was added over a period of 15 minutes. When all the catalyst was charged, the temperature was allowed to rise to 125°F. in 1 hour. The temperature was held at 125°F. for 1 hour. The temperature was allowed to increase to 150°F. over a period of 25 minutes, then held at 150°F. for about 1¼ hours to a free formaldehyde content of 4.5%. The mixture was cooled to 80°F. The pH at the end of reaction was 8.4.

The resin was neutralized with carbon dioxide gas to a pH of 7.23, then sampled for tests.

Results

Properties and Composition - see Table I, Example II

EXAMPLE III

Laboratory preparation of a calcium oxide catalyzed resin of a

Charge Ratio: 3.1 Mol Formaldehyde per 1.0 Mol Phenol

Ingredients

| | | |
|---|---|---|
| Formaldehyde — | aqueous — 44% | 2030 gms |
| Phenol — | USP 98% | 920 gms |
| Calcium oxide — | Beachville rotary crushed high calcium quicklime — CaO 93.5% — (−3) mesh on U.S. standard scale | 53.9 gms (4% Ca) (based on weight of phenol) |

Procedure

Formaldehyde was poured into the glass reactor, and the agitator was started. The phenol was added, followed by the calcium oxide. The temperature was allowed to rise to 120°F. in a period of about 30 minutes. The temperature was held at 120°F. for a period of 3 hours. The temperature was allowed to rise to 140°F in 48 minutes then held at 140°F. for 43 minutes. The temperature was then allowed to rise to 150°F. and the mixture cooked at this temperature to a free formaldehyde content of 5.5%. Then it was cooled to 75°F. The pH at the end of reaction was7.9.

The resin was neutralized with carbon dioxide to a pH of 7.2, then sampled for tests.

Results

Properties and Composition - see Table I, Example III.

EXAMPLE IV

Laboratory preparation of a Calcium Oxide catalyzed resin of a

Charge Ratio: 3.5 Mol Formaldehyde per 1.0 Mol Phenol

Ingredients

| | | |
|---|---|---|
| Formaldehyde — | aqueous — 44% solution | 2139.3 gms |
| Phenol — | USP 98% | 860.7 gms |
| Calcium oxide — | Ashgrove Springfield high calcium pebble quicklime — CaO 96.3% ground to (−10) mesh on U.S. standard | 49.06 (4% Ca) (based on weight of phenol) |

Procedure

The formaldehyde was poured into the glass reactor. The agitator was started. Phenol was added, followed by calcium oxide. The temperature was allowed to rise to 100°F. and the mixture held at that temperature for 45 minutes. The temperature was allowed to increase to 110°F. in 30 minutes period, and held at that temperature for 1 hour and 30 minutes. The temperature was allowed to rise to 130°F. in 30 minutes, and held for 1 hour. The temperature was allowed to rise to 150°F. and held at that temperature till a free formaldehyde of 8.60%. The mixture was cooled to 75°F. The pH at the end of reaction was 8.3.

The resin was neutralized with carbon dioxide to a pH of about 7.2, then sampled for tests.

Results

Properties and Composition - see Table I, Example IV.

EXAMPLE V

Industrial production of a calcia catalyzed resin suitable for use in binders particularly, in varying combinations with urea.

Charge Ratio: 3.7 Mol Formaldehyde per 1 Mol Phenol

Batch Size: 3000 gals.

Ingredients

| | | |
|---|---|---|
| Formaldehyde — | aqueous (44%) solution | 2235 gals. |
| Phenol — | USP 98% | 912 gals. |
| $Ca(OH)_2$ — | Beachville Chemical High Calcium Hydrate Powder taken as 99% pure | 880 lbs. |

Procedure

The 3,000 gals. reactor was loaded with formaldehyde and phenol. The agitator was started. The catalyst ($Ca(OH)_2$) was poured in over a period of about one hour and 35 minutes.

The temperature at this point was about 86°F. It was held at 86°F. for about 25 minutes, then the temperature was allowed to rise to 110°F. for about 28 minutes. The temperature was allowed to rise to 125°F. in 20 minutes and held at 125°F. for about 40 minutes. The temperature was allowed to rise to 150°F. in 50 minutes and held at 150°F. for about 55 minutes to a free formaldehyde of 8.20%. The mixture was cooled to 80°F. The final pH was 8.55.

The resin was neutralized with carbon dioxide to a pH of 7.8, then sampled for tests.

Results

Properties and composition - see Table I, Example V Also Free phenol - 0.3% (by gas chromatography).

In addition the following proportions were determined by gas chromatography of the silylised resin:

Phenol — 3.9
o-methylol phenol — 6.3
p-methylol phenol —4.4
di-phenyl- (o-subst) — 11.1
o-o-di-methylol phenol — 0.6
o-p-di-methylol phenol — 52.7
o-o-p-tri-methylol phenol — 4.6
di-phenyl (4 subst) — 16.4

EXAMPLE VI

Industrial production of a calcium hydroxide catalyzed resin suitable for use in binders, particularly in varying combinations with urea.

Charge Ratio: 3.8 Mol Formaldehyde per 1 Mol phenol

Batch Size: 2400 gals.

Ingredients

| | |
|---|---|
| Formaldehyde | 1804 Imp. Gals. |
| Phenol | 721 Imp. Gals. |
| $Ca(OH_2)$ — High Calcium Beachville chemical hydrate — Powder $Ca(OH)_2$ taken as 91.4% | 750 lbs. |

Procedure

The 3000 gal. reactor was charged with formaldehyde and phenol. The agitator was started. The catalyst (calcium hydroxide) was added over a period of three hours. The temperature was allowed to rise to 84°F. When all the catalyst was loaded, the temperature was allowed to rise to 90°F. then 100°F. and then to 110°F. All these steps were carried out within one hour. The temperature was held at 110°F. for about ½ hour. The temperature was increased to 120°F in 15 minutes and held at 120°F. for about 15 minutes. The temperature was allowed to increase the 130°F. in about 15 minutes, and held at 130°F. for about one hour. The temperature was allowed to increase to 140°F. in about 30 minutes. The temperature was allowed to rise to 147°F. in about 26 minutes and held at 147°F. for about 30 minutes to a free formaldehyde content of 10.5%. The mixture was cooled to 76°F. The pH at the end of reaction was 8.45.

The resin was neutralized with carbon dioxide gas to a pH of 7.2, then sampled for tests.

Results

Properties and composition - see Table I, Example VI.

EXAMPLE VII

Laboratory preparations of a Calcium Oxide catalyzed resin of

Charge Ratio: 4 Mol Formaldehyde per 1 Mol Phenol

Ingredients

| | | |
|---|---|---|
| Formaldehyde — | aqueous — 44% solution | 2218.80 gms |
| Phenol — | USP 98% | 781.20 gms |
| Calcium Oxide — | Ashgrove Springfield high calcium pebble quicklime — CaO 96.3% ground to (−10) mesh on U.S. standard | 55.7 gms |

Procedure

The formaldehyde was poured into the glass reactor. The agitator was started. Phenol was added, followed by calcium oxide. The temperature was allowed to rise to 100°F. in a period of 10 minutes and the temperature was held at this point for 25 minutes. The temperature was allowed to rise to 110°F. in 30 minutes, and held at this point for 1 hour. The temperature was allowed to rise to 120°F. in 30 minutes, and held there for 1 hour. The temperature was allowed to rise to 130°F. in 30 minutes, and held for 1 hour. The temperature was allowed to rise to 140°F. in 30 minutes, and held there until a free formaldehyde of 10.7%. The mixture was cooled to 75°F. The pH at the end of the reaction was 8.6. The resin was neutralized with carbon dioxide to a pH of about 7.2, then sampled for testing.

Results

Properties and composition - see Table I, Example VII.

LABORATORY STUDIES

The following laboratory studies relate the unexpected practical differences between prior art resins and the resins prepared under conditions of this disclosure to quantitative analytical data.

STUDY I 2700 to 3000 cc of mixtures of U.S.P. phenol (98.0%) and 44.1% aqueous formaldehyde solution (0.3% methanol) were prepared with mol ratios ranging from 1 mol phenol to from 2.8 to 4.4 mols formaldehyde and with an initial water content of from 6.0 mol to 10.0 mol of water per mole of the reactants.

The mixtures were catalyzed with either sodium hydroxide, or barium pentahydrate for comparison with calcium hydroxide as catalyst.

In keeping with past practice for phenol formaldehyde resols for bonding glass fibres, the catalyst concentrations were chosen as follows:

Sodium Hydroxide (as 50.0% solution)
2.5 percent Na on the weight of phenol OR: .1022 mol NaOH per mol of phenol Barium Hydroxide (98.5% Pentahydrate)
6.5 percent Ba on the weight of phenol OR: .0446 Mol $Ba(OH)_2$ per mol of phenol Calcium Hydroxide (94.5% $Ca(OH)_2$)

-continued

| | | |
|---|---|---|
| 3.5 to 6.7 percent Ca on the weight of phenol | OR: | .0822 to .1533 mol $Ca(OH)_2$ per mol of phenol. |

(This range closely approximating catalyst solubility in the reactants).

Glass reaction vessels were used throughout.

The following cycle was followed for all laboratory cooks of resins for this study:

a. Phenol and formaldehyde were blended and brought to a temperature not exceeding 85°F, then held at 85°F.

b. Catalyst was added over 15 minutes, and the cook cycle timed from the first catalyst addition.

c. The temperature was allowed to rise in linear fashion 1°F every 3 minutes until it reached 150°F.

d. The temperature was held at 150°F to the end of the cook cycle, i.e.: to initial loss of dilutability with 19 parts of distilled water or to constant (lowest) Free Formaldehyde content whichever is reached first.

e. The resol solution was cooled to below 75°F, and divided into two equal portions.

One portion was left as cooked, the second portion was neutralized, in keeping with industrial practice:

Sodium resins were neutralized to pH 7.3 with hydrochloric acid (35%).

Barium resins were neutralized to pH 7.3 with dilute sulphuric acid (35%).

Calcium resins were neutralized to pH 7.6 with carbon dioxide gas.

Quantities of each of the non-neutralized and neutralized portions of each resin cook were used for evaluation of resin composition and properties.

The following were observed and recorded, on the samples taken as above, after termination of the cook:

By measurements on resin samples, as produced:
Free (unreacted) formaldehyde
Water dilutability
pH
Free (unreacted) phenol (by gas chromatography
Solids
Ash
Organic Solids
Shelf Life (stability) at: −20°F, 32°F, 75°F, 100°F,
By gas chromatography on silylized resin samples:
Phenol
o-Monomethylol Phenol
p-Monomethylol Phenol
Diphenyl with O substitutions
o-o Dimethylol Phenol
o-p Dimethylol Phenol
o-o-p Trimethylol Phenol
Diphenyl with 4 substitutions Neutralized resin samples containing inorganic precipitates (of barium sulphate or calcium carbonate) were centrifuged prior to gas chromatography.

The results of this study are presented in Table II. Values which are significantly different (higher or lower) for calcium catalyzed resins when compared to sodium or barium catalyzed resins are underlined for easier reading. The equilibria between the methylolated phenols, can be easily disturbed on addition of acids or salts. It is therefore not surprising that the measurements obtained on the non-neutralized resins are more consistent throughout the range of mol ratios investigated. Contrary to prior art indications and teachings catalyzation by calcium hydroxide proceeds qualitatively and quantitatively to different results than catalyzation by sodium hydroxide or barium hydroxide. The differences show up increasingly with increasing mol ratios of formaldehyde to phenol. More of the available formaldehyde is converted into organic solids and less trimethylol phenol and diphenyl compounds are formed starting at the lowest mole ratio examined. Starting from formaldehyde:phenol mol ratio 3.2:1 up, formation of o-o-dimethylol phenol is minimized. Most strikingly, the formation of o-p-dimethylol phenol is favoured by the presence of calcium hydroxide is catalyst increasingly so for mol ratios 3.5:1 and up. Furthermore, a marked reduction in residual monomethylol phenols is observed for mol ratios 3.6:1 and up.

STUDY II was undertaken to more clearly separate the effects of selective catalyzation by calcium hydroxide from those resulting from high catalyst concentrations per se.

The procedures described for Study I were followed throughout except for the amounts of catalyst added. These were chosen to match exactly those used for the calcium catalyzed cooks of Study I.

The soda and barium catalyzed resins were examined for composition and stability only, not for suitability as binder components. Tables III and IV contain the values measured, for three mole ratios of sodium hydroxide catalyzed resins and two mole ratios of barium hydroxide catalyzed resins.

The tables compare in each case the resins of this study with those most closely corresponding from Study I ( = Table II).

Table III indicates clearly that increased levels of sodium hydroxide catalyst tend to shift values in the direction towards those obtained with calcium hydroxide. At no time however are the distinctive differences in question in resinification efficiency, i.e.: conversion of more formaldehyde to organic resin solids; cone efficiency; selective formation of o-p-dimethylol phenol; or in reduced formation of diphenyls and trimethylol phenol. Table IV indicates that at a formaldehyde:-phenol mol ratio 2.8:1 increased levels of barium hydroxide catalyst minimize differences, except resinification efficiency and formation of diphenyls. At a mol ratio 3.6:1 they tend to shift values in the direction towards those obtained with calcium hydroxide.

The distinctive features of the calcium hydroxide catalyzed resin of 3.6:1 mole ratio previously discussed herein remain significant, such as high resin efficiency; high cone efficiency; reduction in mono-methylol phenol content; preferred formation of o-p-dimethylol phenol and reduced formation of diphenyls and trimethylol phenol. It was reported separately that part of the barium catalyst added remained undissolved, i.e.: exceeded the solubility of barium hydroxide in the system, negating the practicality of concentrations approaching or exceeding 0.12 mol of barium hydroxide per mol of phenol.

Summarizing the analytical findings of Studies I, II and III, we have observed that within the range of mol ratios of 2.8 to 4.4 mol formaldehyde to 1 mol of U.S.P. phenol, and more clearly so from 3.2 to 4.4 mol formaldehyde, catalyzation by calcium hydroxide, as compared to sodium hydroxide and barium hydroxide, unexpectedly:

favours the formation of ortho-para dimethylol phenol, reduces the formation of volatile mono methylol phenols, reduces the formation of the pre-cursors of insoluble higher phenyls, namely o-o-p trimethylol phenol & diphenyls.

We have further observed (probably because of the above selective catalyzation) significantly higher resinification and cone efficiencies of the calcium catalyzed resols, as such.

Although not fully understood, it can be further surmised that the very same compositional differences account for the experience that the calcium catalyzed resols combine with larger proportions of such monomers as urea, melamine or dicyandiamide, or their formaldehyde condensation products, without loss of bond strength.

Table V indicates the hours to complete the reaction and shows calcium to be most economical at all mole rations studied. As the rise in temperature is controlled to be very close for all three catalysts the result supports the view that the reaction proceeds differently when calcium hydroxide is the catalyst.

The following Table VI shows comparative stability data for commercial phenol formaldehyde resol solutions kept in storage under industrial conditions. These figures have been prepared by the inventors from data observed during long operating experience. Compared are the phenol formaldehyde resol solutions in large scale use for bonding glass fibres:

Sodium Hydroxide catalyzed resins in mole ratios up to 2.5:1

Barium Hydroxide catalyzed resins in mole ratios up to 2.5:1

Calcium Hydroxide catalyzed resins in mole ratios up to 2.8:1 to 3.7:1 mol formaldehyde per mol phenol.

The characteristic on which stability is measured for purposes of this table is the dilutability of the resin solution with distilled water. It should be noted that during the period when sodium and barium catalyzed resins were in use, the dilutability was considered acceptable if no less than 800%, indicating that 8 parts of distilled water could be added to 1 part of resin solution without clouding. On the basis of the more favourable experience with calcium catalyzed resins, the minimum acceptable dilutability has been set at no less than 2000%, and the figures tabulated indicate in fact a dilutability of over 2400%, i.e. dilution to 25 times the original volume.

Aqueous solutions or dispersions of the special phenol formaledhyde resins disclosed herein are useful for bonding together mineral wool fibres, for instance glass fibres in the formation of fibrous insulation material.

In the manufacture of inorganic fibrous products, phenol formaldehyde resins, or co-condensates of phenol formaldehyde with related resin forming substances have been used as bonding materials for the fibres, in order to impart integrity of shape, dimensions and physical properties of the finished product. Such resins are most often used as aqueous solutions or dispersions, rarely alone, most frequently combined with other substances, before application to the mineral or glass fibres. The combination of materials is referred to as a "binder". Frequently the other substances are cost reducing extenders, lubricants, dyes or the like.

In other cases, urea, dicyandiamide and/or melamine or their water miscible condensation products with formaldehyde ("aminoplast resins") are added. These may be intended to reduce exothermic activity typical of phenolic resins under cure, or they reduce the air pollution which may occur on a larger scale during the curing of phenol formaldehyde resins alone. They have a decidedly useful effect upon the time-temperature-curing speed relationship of the bonding composition, but by themselves exhibit low to poor bond strength, particularly so under humid conditions.

The phenolic resins and other components are blended in aqueous solution prior to applying the binder to the glass (or other mineral) fibers being formed and collected. Uniformity and stability during prolonged storage and under exposure to such conditions as agitation, aeration, etc. are important in such binder mixtures.

It has been found unexpectedly that the use of the aqueous selectively catalyzed phenol formaldehyde condensates (resols) defined above permits formulation of binders, which compare most favourably with prior art aqueous binders based upon sodium, barium or calcium catalyzed phenol formaldehyde homo-condensation resins or co-polymer resins of phenols with other monomers. Given certain minimum target values for the strength of the bond between the cured resin and the glass fibre, in dry or humid conditions, the novel binder compositions need to contain a smaller proportion of the selectively catalyzed phenolics to amine type monomer or aminoplast resins. In the examples we show that binders prepared in accordance with the present procedure show better bonding characteristics when containing (along with other conventional binder ingredients) 60 parts of the calcium catalyzed phenolic resin to 40 parts of urea, or 54 parts of the calcium catalyzed phenolic resin to 46 parts of urea, even 50 parts of the calcium catalyzed phenolic resins to 50 parts of urea, as compared to binders based upon the prior art barium and soda catalyzed resins which contain 65 – 70 parts phenolic resin to 35 – 30 parts of urea.

Good commercial binders have been produced when as little as 30% of the present calcium catalyzed phenol formaldehyde resin is combined with 70% of the prior art alkylated amine copolymer resins disclosed for example in U.S. Pat. No. 3,624,246 issued Nov. 30, 1971, entitled "Water Soluble or Water Dispersible Alkylated Amine Copolymers" of Deuzeman and Lumley; and in U.S. Pat. No. 3,487,048 issued Dec. 30, 1969, entitled "Methylated Melamine-formaldehyde Condensate" of Deuzeman, disclosures of which are incorporated herein by reference.

Most strikingly, as little as 18 parts of the new resins has been successfully combined with up to 82 parts of a mixture of amine monomers with amine formaldehyde copolymer resins to produce a useful low-phenol material of good bond strength to glass.

Keeping in mind the exceptionally low content in the phenolic resin component itself of volatile phenol and phenol alcohols, there result binder compositions which can be applied and cured with greatly reduced emission of air pollutants.

The binder compositions here disclosed are further characterized by a very favourable transition from the water soluble (resol) to the viscous-flowable to the solid (resite) state from the point of application to full cure. This is variably and controllably affected primarily by judicious choice of the proportions of phenol formaldehyde condensate to monomeric amines to amine formaldehyde condensates incorporated into the binder. It can be further affected by the new freedom to introduce the selective calcia catalyzed resin into the binder compositions without prior acidic neutralization, because of its superior storage stability. The curing characteristics of the binder compositions particularly those containing from 50–60 parts of phenol formaldehyde resins to 50–40 parts of urea generally parallel those of the resin component.

Referring to the commonly accepted A-B-C stages in the cure of a phenolic resin, the phenolic resin exhibits a long A + B stage, good flow characteristics in the B stage and a short curing time from B to C stage. This prevents pre-curing at the point of application (which glass fiber article), but does not adversely affect the overall speed of cure. Because of this, binder compositions made in accordance with the present invention generally may be applied at higher solids concentrations, up to 80%, than the previously known formulations, without incurring pre-cure problems. Thus, the solids level of these binders can be raised over prior art materials, if desired, with further economic advantage. When prior art materials are used at high solids (exceeding 40%) curing occurs prematurely and takes place before the resin is fully distributed over the fibres which are to be bonded.

TABLE No. I

PROPERTIES AND COMPOSITION OF CALCIUM CATALYSED PHENOLIC RESINS MADE IN EXAMPLE I TO VII

| Example No. | I | II | III | IV | V | VI | VII |
|---|---|---|---|---|---|---|---|
| Mole ratio formaldehyde to phenol | 2.8:1 | 2.8:1 | 3.1:1 | 3.5:1 | 3.7:1 | 3.8:1 | 4.0:1 |
| Organic solids | 48.44 | 48.66 | 45.61 | 42.8 | 44.5 | 39.63 | 40.2 |
| Ash as CaO | 2.2 | 2.2 | 2.1 | 2.0 | 2.03 | 1.9 | 1.9 |
| Free formaldehyde % | 4.5 | 4.5 | 5.5 | 8.6 | 8.2 | 10.5 | 10.7 |
| Free phenol (by gas chromatographic analysis) | 1.8 | 1.8 | 0.82 | 0.38 | <0.1 | 0.14 | 0.29 |
| pH | 8.7 | 8.4 | 7.9 | 8.3 | 8.8 | 8.45 | 8.6 |
| *Gel Time (secs) | 528 | 528 | 508 | 503 | 512 | 711 | 655 |
| Cone Efficiency | — | 73.0 | 78.4 | 83.4 | — | — | 82.4 |
| Dilutability | inf. | inf. | inf. | inf. | inf. | inf. | inf. |

*This test only performed after neutralization of the resin.

adversely affects productivity and quality of the shaped

TABLE II

| | FINISHED NON-NEUTRALIZED RESINS | | | | | | | | |
|---|---|---|---|---|---|---|---|---|---|
| Mol Ratio | 2.8:1 | | | 3.2:1 | | | 3.4:1 | 3.5:1 | 3.6:3 |
| Formaldehyde to Phenol Catalyst | Na | Ba | Ca | Na | Ba | Ca | Ca | Ca | Na |
| By Direct Analysis | | | | | | | | | |
| Free Phenol | <0.1 | 0.1 | 0.5 | 0.1 | 0.7 | <0.1 | <0.1 | <0.1 | <0.1 |
| Free Formaldehyde | 5.2 | 4.9 | 4.6 | 7.5 | 7.7 | 6.4 | 7.4 | 7.65 | 10.18 |
| Organic Solids | 45.9 | 46.2 | 48.1 | 42.7 | 43.5 | 46.1 | 44.8 | 44.4 | 39.6 |
| Cone Efficiency | 73.2 | 78.7 | 77.7 | 77.4 | 75.6 | 79.6 | 80.8 | 80.9 | 79.5 |
| By Silylization | | | | | | | | | |
| Phenol | 13.6 | 15.5 | 19.8 | 5.7 | 9.0 | 11.3 | 10.2 | 6.3 | 3.8 |
| o-methylol | 13.8 | 10.9 | 18.1 | 9.4 | 6.7 | 11.1 | 13.9 | 10.0 | 7.2 |
| p-methylol | 11.3 | 10.5 | 10.6 | 7.8 | 5.9 | 9.0 | 10.5 | 6.0 | 7.0 |
| Diphenyl (O) | 17.1 | 12.0 | 14.3 | 14.8 | 9.8 | 12.0 | 9.4 | 12.1 | 12.2 |
| o-o-dimethylol | 1.4 | 0.7 | 0.5 | 1.8 | 1.2 | 0.7 | 0.7 | 0.6 | 3.4 |
| o-p-dimethylol | 30.7 | 34.4 | 32.9 | 38.3 | 42.8 | 42.8 | 43.3 | 50.9 | 36.6 |
| o-o-p-trimethylol | 4.9 | 5.2 | 2.3 | 10.3 | 13.5 | 6.8 | 7.9 | 7.4 | 18.6 |
| Diphenyl (4) | 7.2 | 10.8 | 1.5 | 11.9 | 11.1 | 6.3 | 4.1 | 6.7 | 11.2 |
| | FINISHED NEUTRALIZED RESINS | | | | | | | | |
| By Direct Analysis | | | | | | | | | |
| Free Phenol | <0.1 | 0.4 | 1.4 | 0.2 | 0.85 | <0.1 | <0.1 | <0.1 | <0.1 |
| Free Formaldehyde | — | — | — | — | — | — | — | — | — |
| Organic Solids | 45.3 | 44.0 | 47.7 | 42.4 | 42.3 | 46.2 | 44.7 | 44.8 | 40.2 |
| Cone Efficiency | 72.4 | 76.1 | 75.7 | 76.1 | 76.9 | 77.5 | 77.9 | 76.4 | 78.9 |
| By Silylization | | | | | | | | | |
| Phenol | 15.4 | 21.0 | 17.9 | 6.8 | 17.0 | 11.9 | 9.9 | 8.4 | 5.7 |
| o-methylol | 12.3 | 12.2 | 14.8 | 9.4 | 11.1 | 11.3 | 13.5 | 11.2 | 7.1 |
| p-methylol | 14.8 | 11.0 | 7.8 | 7.1 | 10.1 | 9.8 | 10.5 | 8.2 | 6.6 |
| Diphenyl (O) | 16.9 | 11.4 | 11.5 | 12.2 | 12.4 | 12.3 | 9.2 | 12.3 | 11.9 |
| o-o-dimethylol | 2.6 | 1.6 | 1.1 | 2.6 | 1.6 | 0.8 | 0.8 | 0.7 | 4.6 |
| o-p-dimethylol | 28.0 | 30.8 | 35.1 | 39.5 | 33.7 | 43.2 | 41.5 | 46.5 | 48.4 |
| o-o-p-trimethylol | 9.2 | 10.2 | 10.8 | 19.4 | 13.1 | 9.4 | 12.0 | 11.2 | 8.2 |
| Diphenyl (4) | 0.8 | 1.8 | 1.0 | 3.0 | 1.0 | 1.3 | 2.6 | 1.5 | 7.5 |

| | FINISHED NON-NEUTRALIZED RESINS | | | | | | | | |
|---|---|---|---|---|---|---|---|---|---|
| Mol Ratio Formaldehyde to Phenol | 3.6:1 | | 3.8:1 | 4.0:1 | | | 4.4:1 | | |
| Catalyst | Ba | Ca | Ca | Na | Ba | Ca | Na | Ba | Ca |
| By Direct Analysis | | | | | | | | | |
| Free Phenol | <0.1 | <0.1 | <0.1 | <0.1 | <0.1 | <0.1 | <0.1 | <0.1 | <0.1 |
| Free Formaldehyde | 10.0 | 8.4 | 9.85 | 12.2 | 11.9 | 10.0 | 13.8 | 13.8 | 12.1 |
| Organic Solids | 41.1 | 42.6 | 42.6 | 37.9 | 38.7 | 40.9 | 36.0 | 36.5 | 38.1 |
| Cone Efficiency | 78.5 | 83.3 | 83.9 | 78.2 | 74.5 | 86.9 | 76.6 | 76.8 | 91.2 |
| By Silylization | | | | | | | | | |
| Phenol | 7.6 | 4.1 | 3.4 | 2.8 | 7.5 | 2.3 | 2.3 | 5.9 | 0.6 |
| o-methylol | 8.2 | 6.7 | 5.8 | 5.6 | 9.2 | 5.0 | 3.8 | 7.0 | 1.4 |

TABLE II-continued

| Mol Ratio | 2.8:1 | | | 3.2:1 | | | 3.4:1 | 3.5:1 | 3.6:3 |
|---|---|---|---|---|---|---|---|---|---|
| FINISHED NON-NEUTRALIZED RESINS | | | | | | | | | |
| p-methylol | 9.2 | 5.5 | 4.0 | 6.3 | 11.8 | 4.7 | 5.7 | 9.6 | 1.0 |
| Diphenyl (O) | 11.1 | 9.6 | 9.4 | 12.3 | 10.9 | 6.6 | 11.5 | 12.1 | 3.4 |
| o-o-dimethylol | 1.5 | 1.0 | 0.7 | 3.7 | 1.8 | 0.4 | 5.5 | 2.4 | 0.6 |
| o-p-dimethylol | 37.3 | 57.6 | 54.8 | 37.9 | 34.8 | 58.5 | 35.0 | 36.8 | 58.0 |
| o-o-p-trimethylol | 16.8 | 9.3 | 13.7 | 20.8 | 15.6 | 12.8 | 24.8 | 18.8 | 21.0 |
| Diphenyl (4) | 8.3 | 6.2 | 8.2 | 10.6 | 8.4 | 9.7 | 11.4 | 7.4 | 14.0 |
| FINISHED NEUTRALIZED RESINS | | | | | | | | | |
| By Direct Analysis | | | | | | | | | |
| Free Phenol | <0.1 | <0.1 | <0.1 | <0.1 | <0.1 | <0.1 | <0.1 | <0.1 | <0.1 |
| Free Formaldehyde | — | — | — | — | — | — | — | — | — |
| Organic Solids | 40.1 | 42.6 | 43.4 | 37.6 | 37.8 | 41.5 | 36.0 | 35.8 | 39.2 |
| Cone Efficiency | 75.9 | 78.0 | 79.1 | 77.0 | 73.2 | 80.5 | 78.4 | 76.0 | 81.5 |
| By Silylization | | | | | | | | | |
| Phenol | 9.1 | 6.3 | 3.8 | 3.8 | 13.0 | 1.9 | 3.2 | 11.4 | 0.6 |
| o-methylol | 7.7 | 7.9 | 4.6 | 5.8 | 10.3 | 4.2 | 3.4 | 7.3 | 1.3 |
| p-methylol | 8.1 | 7.0 | 4.1 | 6.3 | 13.2 | 4.1 | 5.9 | 14.3 | 1.3 |
| Diphenyl (O) | 10.3 | 12.0 | 9.0 | 11.1 | 10.2 | 5.8 | 11.2 | 13.2 | 4.3 |
| o-o-dimethylol | 1.6 | 1.0 | 1.5 | 4.3 | 3.0 | 0.6 | 4.8 | 2.7 | 0.8 |
| o-p-dimethylol | 40.4 | 53.3 | 51.7 | 37.9 | 30.0 | 52.2 | 35.6 | 32.7 | 58.0 |
| o-o-p-trimethylol | 19.7 | 11.0 | 23.8 | 27.5 | 19.5 | 27.1 | 31.5 | 17.6 | 29.0 |
| Diphenyl (4) | 3.1 | 0.6 | 1.5 | 3.3 | 0.8 | 4.1 | 4.4 | 0.8 | 3.5 |

TABLE III

| Non-Neutralised Mol Ratio | 3.4:1 | | | 3.6:1 | | | 4.0:1 | | |
|---|---|---|---|---|---|---|---|---|---|
| Formaldehyde to phenol Catalyst | NaOH | NaOH | $Ca(OH)_2$ | NaOH | NaOH | $Ca(OH)_2$ | NaOH | NaOH | $Ca(OH)_2$ |
| Mol % on phenol | 10.22 | 11.03 | 11.03 | 10.22 | 11.97 | 11.97 | 10.22 | 13.85 | 13.85 |
| By direct analysis | | | | | | | | | |
| Free phenol | — | <0.1 | <0.1 | <0.1 | <0.1 | <0.1 | <0.1 | <0.1 | <0.1 |
| Free formald. | — | 8.55 | 7.4 | 10.2 | 9.5 | 8.4 | 12.2 | 11.6 | 10.0 |
| Organic Solids | — | 41.8 | 44.8 | 39.6 | 40.0 | 42.6 | 37.9 | 37.3 | 40.9 |
| Cone Eff. | — | 75.6 | 80.8 | 79.5 | 79.9 | 83.3 | 78.2 | 80.2 | 86.9 |
| By silylisation | | | | | | | | | |
| Phenol | — | 5.4 | 10.2 | 3.8 | 4.4 | 4.1 | 2.8 | 2.0 | 2.3 |
| o-methylol | — | 7.6 | 13.9 | 7.2 | 6.8 | 6.7 | 5.6 | 3.2 | 5.0 |
| p-methylol | — | 9.3 | 10.5 | 7.0 | 8.6 | 5.5 | 6.3 | 4.0 | 4.7 |
| Diphenyl (o) | — | 19.5 | 9.4 | 12.2 | 17.8 | 9.6 | 12.3 | 13.1 | 6.6 |
| 0-0-dimethylol | — | 2.2 | 0.7 | 3.4 | 2.1 | 1.0 | 3.7 | 3.8 | 0.4 |
| o-p-dimethylol | — | 37.3 | 43.3 | 36.6 | 39.5 | 57.6 | 37.9 | 40.7 | 58.5 |
| o-o-p trimethylol | — | 8.8 | 7.9 | 18.6 | 10.0 | 9.3 | 20.8 | 19.5 | 12.8 |
| Diphenyl (4) | — | 9.9 | 6.2 | 11.2 | 10.8 | 6.2 | 10.6 | 13.7 | 9.7 |
| Neutralised | | | | | | | | | |
| Mol % on phenol | 10.22 | 11.03 | 11.03 | 10.22 | 11.97 | 11.97 | 10.22 | 13.85 | 13.85 |
| By direct analysis | | | | | | | | | |
| Free phenol | — | <0.1 | <0.1 | <0.1 | <0.1 | <0.1 | <0.1 | <0.1 | <0.1 |
| Free formald. | — | — | — | — | — | — | — | — | — |
| Organic Solids | — | 41.4 | 46.2 | 40.2 | 40.0 | 42.6 | 37.6 | 37.4 | 41.5 |
| Cone Eff. | — | 73.6 | 77.5 | 78.9 | 76.6 | 78.0 | 77.0 | 75.8 | 80.5 |
| By silylisation | | | | | | | | | |
| Phenol | — | 6.2 | 9.9 | 5.7 | 5.2 | 6.3 | 3.8 | 1.7 | 1.9 |
| o-methylol | — | 7.4 | 13.5 | 7.1 | 5.5 | 7.9 | 5.8 | 1.7 | 4.2 |
| p-methylol | — | 9.0 | 10.5 | 6.6 | 7.4 | 7.9 | 6.3 | 2.4 | 4.1 |
| Diphenyl (o) | — | 15.1 | 9.2 | 11.9 | 12.4 | 12.0 | 11.1 | 9.5 | 5.8 |
| o-o-dimethylol | — | 3.7 | 0.8 | 4.6 | 3.7 | 1.0 | 4.3 | 41.4 | 0.6 |
| o-p-dimethylol | — | 35.4 | 41.5 | 48.4 | 38.0 | 53.3 | 37.9 | 41.3 | 52.2 |
| o-o-p trimethylol | — | 18.0 | 12.0 | 8.2 | 21.2 | 11.0 | 27.5 | 31.0 | 27.1 |
| Diphenyl (4) | — | 5.2 | 2.6 | 7.5 | 6.6 | 0.6 | 3.3 | 8.0 | 4.1 |

TABLE IV

| Non-Neutralised Mol Ratio | | 2.8:1 | | | 3.6:1 | |
|---|---|---|---|---|---|---|
| formaldehyde to phenol Catalyst | $Ba(OH)_2$ | $Ba(OH)_2$ | $Ca(OH)_2$ | $Ba(OH)_2$ | $Ba(OH)_2$ | $Ca(OH)_2$ |
| Mol % on phenol | 4.46 | 8.22 | 8.22 | 4.46 | 11.97 | 11.97 |
| By direct analysis | | | | | | |
| Free phenol | <0.10 | 0.10 | 0.5 | <0.1 | <0.1 | <0.1 |
| Free formald. | 4.9 | 4.3 | 4.6 | 10.0 | 8.6 | 8.4 |
| Organic Solids | 46.2 | 44.8 | 48.1 | 41.1 | 38.2 | 42.6 |
| Cone Eff. | 78.7 | 80.4 | 77.7 | 78.5 | 80.3 | 83.3 |
| By silylisation | | | | | | |

TABLE IV-continued

| Non-Neutralised Mol Ratio formaldehyde to phenol | 2.8:1 | | | 3.6:1 | | |
|---|---|---|---|---|---|---|
| Catalyst | $Ba(OH)_2$ | $Ba(OH)_2$ | $Ca(OH)_2$ | $Ba(OH)_2$ | $Ba(OH)_2$ | $Ca(OH)_2$ |
| Mol % on phenol | 4.46 | 8.22 | 8.22 | 4.46 | 11.97 | 11.97 |
| Phenol | 15.5 | 15.1 | 19.8 | 7.6 | 7.9 | 4.1 |
| O-Methylol | 10.9 | 12.2 | 18.1 | 8.2 | 8.1 | 6.7 |
| p-methylol | 10.5 | 15.1 | 10.6 | 9.2 | 8.5 | 5.5 |
| Diphenyl (o) | 12.0 | 13.0 | 14.3 | 11.1 | 12.7 | 9.6 |
| o-o-dimethylol | 0.7 | 0.3 | 0.5 | 1.5 | 0.9 | 1.0 |
| o-p-dimethylol | 34.4 | 31.6 | 32.9 | 37.3 | 42.9 | 57.6 |
| o-o-p-trimethylol | 5.2 | 1.6 | 2.3 | 16.8 | 9.4 | 9.3 |
| Diphenyl (4) | 10.8 | 11.1 | 1.5 | 8.3 | 9.6 | 6.2 |
| Neutralised Mol % on phenol | 4.46 | 8.22 | 8.22 | 4.46 | 11.97 | 11.97 |
| By direct analysis Free phenol | <0.1 | 0.15 | 1.4 | <0.1 | <0.1 | <0.1 |
| Free formald. | — | — | — | — | — | — |
| Organic Solids | 44.0 | 42.0 | 47.7 | 40.1 | 36.6 | 42.6 |
| Cone Eff. | 76.1 | 76.8 | 75.7 | 75.9 | 76.8 | 78.0 |
| By silylisation Phenol | 21.0 | 20.0 | 17.9 | 9.1 | 7.7 | 6.3 |
| o-methylol | 12.2 | 11.8 | 14.8 | 7.7 | 7.5 | 7.9 |
| p-methylol | 11.0 | 16.7 | 7.8 | 8.1 | 8.8 | 7.9 |
| Diphenyl (o) | 11.4 | 11.4 | 11.5 | 10.3 | 12.9 | 12.0 |
| o-o-dimethylol | 1.6 | 0.8 | 1.1 | 1.6 | 1.0 | 1.0 |
| o-p-dimethylol | 30.8 | 32.5 | 35.1 | 40.4 | 45.3 | 53.3 |
| o-o-p trimethylol | 10.2 | 5.8 | 10.8 | 19.7 | 12.2 | 11.0 |
| Diphenyl (4) | 1.8 | 1.0 | 1.0 | 3.1 | 4.6 | 0.6 |

TABLE V

| Mol Ratio Formaldehyde to Phenol | | HOURS TO COMPLETE THE REACTION 2.8:1 | 3.2:1 | 3.4:1 | 3.5:1 | 3.6:1 | 3.8:1 | 4.0:1 | 4.4:1 |
|---|---|---|---|---|---|---|---|---|---|
| Catalyst, | Mol per Mol Phenol | | | | | | | | |
| NaOH | .1022 | 6.5 | 6.5 | — | — | 6.5 | — | 6.5 | 6.5 |
| | .1103 | | | 5.75 | | | | | |
| | .1197 | | | | | 5.75 | | | |
| | .1385 | | | | | | | 5.5 | |
| $Ba(OH)_2$ | .0446 | 6.5 | 6.0 | — | — | 6.0 | — | 5.5 | 5.5 |
| | .0822 | 4.5 | | | | | | | |
| | .1197 | | | | | 3.5 | | | |
| $Ca(OH)_2$ | .0822 | 4.75 | | | | | | | |
| | .1009 | | 5.0 | | | | | | |
| | .1103 | | | 4.5 | | | | | |
| | .1150 | | | | 4.5 | | | | |
| | .1197 | | | | | 4.75 | | | |
| | .1291 | | | | | | 4.5 | | |
| | .1385 | | | | | | | 4.75 | |
| | .1573 | | | | | | | | 4.5 |

TABLE VI

| Formaldehyde: Phenol Mol Ratio | Up to 2.5:1 | | Up to 2.5:1 | | 2.8:1 to 3.7:1 | |
|---|---|---|---|---|---|---|
| Catalyst | NaOH | | $Ba(OH)_2$ | | $Ca(OH)_2$ | |
| Resin | As produced | Neutralized | As produced | Neutralized | As produced | Neutralized |
| Storage Temp. °F | | | | | | |
| Frozen | — | 6 mo. | — | 6 mo. | — | 3 yrs. |
| 30°F | Unstable | 2 wks. | Unstable | 4 wks. | 1 yr. | 1 yr. |
| 50°F | " | 3–5 days | " | 1 wk. | 2 mo. | 6 mo. |
| 70°F | " | 2 days | " | 4 days | 2 wks. | 1 mo. |

TABLE VII

SHELF LIFE, DAYS

Non-neutralized resin.

| Resin Mol Ratio | Catalyst Type | Mol/Mol Phenol | 100°F | 75°F |
|---|---|---|---|---|
| Formaldehyde to Phenol | | | | |
| 2.8:1 | NaOH | .1022 | 16 | 42 |

TABLE VII-continued

SHELF LIFE, DAYS

Non-neutralized resin.

| Resin Mol Ratio | Catalyst Type | Mol/Mol Phenol | 100°F | 75°F |
|---|---|---|---|---|
| 3.8:1 | " | " | 16 | 72 |
| 3.6:1 | " | " | 16 | 83 |

TABLE VII-continued

SHELF LIFE, DAYS

Non-neutralized resin.

| Resin Mol Ratio | Catalyst Type | Mol/Mol Phenol | 100°F | 75°F |
|---|---|---|---|---|
| 4.0:1 | " | " | 16 | 86 |
| 4.4:1 | " | " | 16 | >86 |
| 3.4:1 | " | .1103 | | |
| 3.6:1 | " | .1197 | 16 | >86 |
| 4.0:1 | " | .1385 | | |
| 2.8:1 | $Ba(OH)_2$ | .0446 | 4 | 20 |
| 3.2:1 | " | " | 8 | 32 |
| 3.6:1 | " | " | 8 | 36 |
| 4.0:1 | " | " | 8 | 48 |
| 4.4:1 | " | " | 8 | 56 |
| 2.8:1 | " | .0822 | 8 | 32 |
| 3.6:1 | " | .1197 | 8 | 36 |
| 2.8:1 | $Ca(OH)_2$ | .0822 | 4 | 24 |
| 3.2:1 | " | .1009 | 4 | 24 |
| 3.4:1 | " | .1103 | 4 | 24 |
| 3.5:1 | " | .1150 | 4 | >24 |
| 3.6:1 | " | .1197 | 4 | 20 |
| 3.8:1 | " | .1291 | 4 | 20 |
| 4.0:1 | " | .1385 | 4 | 16 |
| 4.4:1 | " | .1573 | 4 | 16 |

All resins tested were very stable at 32°F and −20°F

TABLE VIII

SHELF LIFE, DAYS

| Neutralized Formaldehyde to Phenol Resin Mol Ratio | Catalyst Type | Catalyst Mol/Mol Phenol | 100°F | 75°F |
|---|---|---|---|---|
| 2.8:1 | NaOH | .1022 | 4 | 8 |
| 3.2:1 | " | " | 4 | 8 |
| 3.6:1 | " | " | 4 | 12 |
| 4.0:1 | " | " | 4 | 20 |
| 4.4:1 | " | " | 4 | 16 |
| 3.4:1 | " | .1103 | 4 | 20 |
| 3.6:1 | " | .1197 | 4 | 16 |
| 4.0:1 | " | .1385 | 4 | 20 |
| 2.8:1 | $Ba(OH)_2$ | .0446 | 4 | 4 |
| 3.2:1 | " | " | 4 | 4 |
| 3.6:1 | " | " | 4 | 8 |
| 4.0:1 | " | " | 4 | 16 |
| 4.4:1 | " | " | 4 | 24 |
| 2.8:1 | " | .0822 | 4 | 8 |
| 3.6:1 | " | .1197 | 4 | 4 |
| 2.8:1 | $Ca(OH)_2$ | .0822 | 28 | 28 |
| 3.2:1 | " | .1009 | 4 | 24 |
| 3.4:1 | " | .1103 | 4 | 36 |
| 3.5:1 | " | .1150 | 8 | 32 |
| 3.6:1 | " | .1197 | 8 | 32 |
| 3.8:1 | " | .1291 | 8 | 44 |
| 4.0:1 | " | .1385 | 4 | 36 |
| 4.4:1 | " | .1573 | 8 | 36 |

All resins tested were very stable at 32°F and −20°F.

The principal components of the low phenol aqueous thermosettable compositions suitable for bonding mineral fibre (or paper) products disclosed in this application comprise:

a. Aminoplast resins or non-phenolic monomeric materials capable of co-condensing with formaldehyde.

b. A substantially phenol free infinitely dilutable thermosettable phenol formaldehyde resol solution.

c. Ammonia or a water soluble amine to a pH of about 7 to 9.

d. An acidic curing catalyst in an amount of 0.1 to 2 percent by weight based on the weight of the resin components.

e. Water to a solids content of 1 – 80 percent.

The preferred thermosettable binder compositions comprise co-condensible monomers chosen from the group consisting of melamine, urea, dicyandiamide, acetone, methanol and glycols and aminoplast resins chosen from urea formaldehyde resin, melamine formaldehyde resin and alkylated amine formaldehyde copolymer resins.

They can be modified further by incorporation of one or more known binder additives chosen from the group consisting of coupling agents such as silanes, emulsified mineral oil, ammonium lignosulphonate, tall oil, finely divided mineral fillers, viscosity control agents, dyes and non-reactive resins.

An example of an appropriate non-reactive resin would be Vinsol (Trade mark of Hercules Chemical Company) which is a dark, brittle, natural resin derived from naval stores. It has been found very useful as a component of the binders for glass insulation fibers, especially where such products are intended for bonding glass fibers for odour free refrigerator insulation.

The resin component (b) is one of the phenol free aqueous thermosettable phenol formaldehyde condensation resins described earlier in this application as being selectively catalysed from high mol ratio blends of Formaldehyde to Phenol. The preferred resin is derived from ratio's of 3.5 to 3.8 Mols of Formaldehyde to 1 Mol of Phenol. The resin may be introduced with or without prior neutralization.

The ammonia or water soluble amine (c) is used to adjust the pH of the composition, to a preferred value of 8.3 – 8.6. This may drift on storage to a slightly more acid value. If an amine is used, it may be a volatile amine such as benzylamine, diethylamine, dimethylamine, ehtylamine, methylamine, trimethylamine, monoethanolamine, or a less volatile amine such as diethanolamine, triethanolamine or morpholine.

The acid curing catalyst (d) will normally be added in the form of a salt preferably an ammonium or amine salt of conventional acids such as sulfuric, phosphoric, sultamic, acetic, maleic and carbonic acids.

The amount of water (e) may be varied over a wide range so as to yield optimum application characteristics and will be in the range of 20% and over, most frequently 70% or over.

These binders are further combined with mineral fibres and especially glass fibres to manufacture fibrous insulation products, imparting integrity of shape and physical properties to the finished product. They are particularly applicable to the bonding of batts and other shaped articles produced from glass fibres, which may be in the form of continuous filaments, chopped fiber or glass wool and the like, formed by a variety of processes such as steam blowing, flame blowing, centrifugal fiberizing and other gaseous entrainment processes.

In one embodiment the present invention provides a shaped article consisting of mineral fibers particularly glass fibers bonded with a cured bonding agent derived from aqueous binders of this type.

The following examples are intended to exemplify further the principles of this invention as far as it pertains to the preparation of aqueous heat hardenable binders for glass fibre products and to the products there from.

The examples are not intended to be limiting in their scope.

EXAMPLE VIII

The neutralized phenol formaldehyde resins of Examples I thru VII were used to prepare some typical bonding compositions for glass fibre products, in which urea, (solid, or in aqueous 50% solution) was combined with the phenolic resin. Ammonium Sulphate was used as acidic catalyst and ammonium hydroxide was used to adjust the pH. Silicone (amino ethyl amino propyl trimethoxysilane) and mineral oil emulsion were also included in the binders.

The binders were prepared by mixing the ingredients while adding these in sequence to the phenol formaldehyde resin component.

In large scale operations this mixing procedure can be carried out in batches or by continuous proportioning pumps. Greater or lesser concentrations of the basic binder compositions can be prepared by adding less or more water of dilution in a practically desirable range of from 1 to 80% organic solids, with the water of dilution added at the time of preparation, or upon delivery to the point of application of the aqueous bonding composition to the glass fibres.

The compositions and evaluations are shown in Table VII A. It will be noted that the resins of this invention permit the use of significantly larger proportions of urea then prior resins without loss of excellent bonding properties.

TABLE VII - A

BINDERS MADE FROM RESINS OR SAMPLES 1–7

Calcium catalysed Phenol Formaldehyde Resin Combined with Urea

| Binder Ref. | Phenolic Resin Used Table I References | Wt. of Resin (gms) | Wt. of Urea (gms) | Wt. Ammonium Sulphate 10% Aqueous Sol'n (gms) | Wt. Ammonium Hydroxide (gms) | Wt. Silicone 10% sol. w.w. (gms) | Wt. Oil mul. 50% w.w. `gms) | Wt. ater gms) | Phenolic Resin Mole Ratio Formaldehyde to Phenol | Binder Solids % Phen. Resn. | % Urea | Standard Tensile Strength (psi) dry | wet | Gel Time (Binder at 2661 secs) |
|---|---|---|---|---|---|---|---|---|---|---|---|---|---|---|
| 8-1 | Example 1 | 135 | 35 | 10 | 1 | 1 | 20 | 350 | 2.8:1 | 65 | 35 | 717 | 442 | 740 |
| 8-2 | Example 2 | 131.5 | 40 | 10 | 1 | 1 | 20 | 350 | 3.1:1 | 60 | 40 | 558 | 434 | 935 |
| 8-3 | Example 3 | 126 | 46 | 10 | 1 | 1 | 20 | 350 | 3.5:1 | 54 | 46 | 665 | 453 | 1126 |
| 8-4 | Example 4 | 120 | 46 | 10 | 1 | 1 | 10 | 350 | 3.6:1 | 54 | 46 | 852 | 504 | |
| 8-5 | Example 5 | 121 | 46 | 10 | 1 | 1 | 20 | 350 | 3.7:1 | 54 | 46 | 727 | 326 | 1076 |
| 8-6 | Example 6 | 126 | 50 | 10 | 1 | 1 | 0–20 | 350 | 3.8:1 | 50 | 50 | 656 | 457 | 1347 |
| 8-7 | Example 7 | 124 | 50 | 10 | 1 | 1 | 20 | 350 | 4.0:1 | 50 | 50 | 403 | 485 | 1437 |

EXAMPLE IX

The calcium catalysed water-soluble resin of Example III (mole ratio 3.1 Moles formaldehyde to 1 Mol Phenol was compounded into a binder for mineral glass fibres following the general procedure of Example VIII. An alkylated amine co-polymer resin was included as a co-condensing resin. Urea was added as a co-condensing monomer. Ammonium sulphate was added as an acidic catalyst and ammonium hydroxide was used to adjust the pH. Silicone (amino ethyl amine propyl tri methoxy silane) and mineral oil emulsion were also included in the binder. The binder was prepared by adding the above in order to the phenolic component. The resin solids of the above had the following composition by weight.

| | % | Parts |
|---|---|---|
| Calcium catalyzed water-soluble phenolic resin | 18.1 | 19 |
| Alkylated amine copolymer resin (UFC-31) | 66.5 | 70 |
| Urea | 10.5 | 11 |
| Ammonium sulphate | .14 | |
| Silicone | .19 | |
| Mineral Oil | 4.57 | |
| TOTAL SOLIDS | 100.00 | 100 |

The thermosetting alkylated amine-co-polymer was produced by the reaction of melamine, urea, formaldehyde and methanol in the presence of an alkanol amine and a fatty acid following the art disclosed in U.S. Pat. No. 3,624,246 issued 30 Nov. 1971 entitled "Water Dispersible or Water Soluble Alkylated Amine Copolymers" of Deuzeman et al. At a suitable solids concentration in water, this binder was applied to glass wool which was formed into moulded pipe insulation. A similar insulation made using barium catalysed phenolic resin mole ratio 2.1 Mols formaldehyde to 1.0 Mol phenol was used as a reference standard for evaluation of the above binder and product. Evaluation of the samples of moulded pipe gave the results shown in Table VIIIA. Based on this evaluation, the experimental material was rated as most suitable for manufacture of moulded pipe insulation.

TABLE VIII-A

MOULDED PIPE TRAIL
TO COMPARE BINDER OF EXAMPLE IX WITH A BINDER MADE FROM
STANDARD BARIUM CATALYSED RESIN

| Properties | | 600°F Std | 600°F Expt | 650°F Std | 650°F Expt | 700°F Std | 700°F Expt | 750°F Std | 750°F Expt |
|---|---|---|---|---|---|---|---|---|---|
| 1. | Density(pcf) | 6.7 | 6.2 | 6.6 | 6.2 | 6.3 | 6.1 | 6.2 | 5.9 |
| 2. | Ignition loss % | 7.2 | 6.8 | 8.0 | 7.0 | 6.7 | 6.4 | 6.5 | 6.6 |
| 3. | Extraction Loss % | 5.1 | 4.7 | 5.3 | 4.7 | 5.2 | 4.1 | 3.4 | 3.8 |
| 4. | Durability | | | | | | | | |
| a/ | Humidity Swelling % (120°F) gap | 1.5 | 1.1 | 0.9 | 0.8 | 1.1 | 0.7 | 1.0 | 0.5 |
| | (in) | 0.1 | 0.05 | 0.12 | 0.05 | 0.07 | 0.05 | 0.09 | 0.06 |
| b/ | Autoclave Swelling-% (5 psi) | 7.5 | 5.7 | 5.7 | 2.5 | 2.2 | 1.6 | 1.0 | 0.7 |

TABLE VIII-A-continued

MOULDED PIPE TRAIL
TO COMPARE BINDER OF EXAMPLE IX WITH A BINDER MADE FROM
STANDARD BARIUM CATALYZED RESIN

| Properties | 600°F Std | 600°F Expt | 650°F Std | 650°F Expt | 700°F Std | 700°F Expt | 750°F Std | 750°F Expt |
|---|---|---|---|---|---|---|---|---|
| Gap (in) | 1.05 | 0.40 | 0.46 | 0.14 | 0.14 | 0.19 | 0.10 | 0.07 |
| 5. Punking Spread (in) | 2.82 | 2.80 | 2.89 | 2.89 | 2.76 | 2.77 | 2.95 | 2.72 |
| (1300°F probe) | | | | | | | | |
| % | 101.4 | 100.7 | 104.0 | 104.0 | 99.3 | 99.6 | 106.1 | 97.8 |

EXAMPLE X

The calcium catalysed water soluble resin of Example VI (3.8 Mols formaldehyde to 1.0 Mol phenol) was compounded into a binder using the ingredients and procedure of Example IX so as to yield a product with the following composition by weight:

| | % | Parts |
|---|---|---|
| Calcium catalyzed water soluble phenolic resin | 36.0 | 40 |
| Alkylated amine co-polymer resin | 31.5 | 35 |
| Urea | 22.5 | 25 |
| Ammonium sulphate | .45 | |
| Silicone | .09 | |
| Mineral Oil | 9.46 | |
| | 100.00 | 100 |

This binder was used to fabricate a glass fiber refrigeration insulation material of 2 inch nominal thickness, and this product was tested against a standard insulation of 3 inch thickness with the following satisfactory results.

| | A | B |
|---|---|---|
| 1. Recovery (thickness in ins.) | 3.20 | 2.06 |
| 2. Parting strength (lbs/gms) | | |
| (a) Machine Direction | | |
| i) as received | 0.63 | 0.83 |
| ii) after autoclaving | 0.31 | 0.46 |
| % loss in strength after autoclaving | 50.8 | 44.6 |
| (b) Cross-machine | | |
| i) as received | 0.71 | 0.82 |
| ii) after autoclaving | 0.37 | 0.46 |
| % loss in strength after autoclaving | 47.9 | 43.9 |
| 3. Density (pcf) | 1.13 | 1.09 |
| 4. Compressive Strength at 25% deformation (psi) | 9.2 | 9.4 |
| 5. Ignition loss (%) | 5.1 | 3.8 |
| | 5.4 | 4.2 |
| 6. Fiber Index (H.T.) | 30.0 | 30.0 |
| | | 30.0 |
| 7. Extraction loss (%) | | 11.0 |
| | | 11.6 |

EXAMPLE XI

The calcium catalysed water soluble resin of Example VI (1 mole phenol to 3.8 moles formaldehyde) were compounded into a binder using the ingredients and procedure of example 8–6 in Table VII A.

This product has the following composition by weight on binder solids:

| | %w.w. | Parts |
|---|---|---|
| Calcium catalyzed water soluble phenol formaldehyde resin | 44.5 | 50 |
| Urea | 44.5 | 50 |
| Ammonium Sulphate | .91 | |
| Silicone | .09 | |
| Mineral Oil | 10.00 | |
| | 100.00 | 100 |

This binder was used to fabricate a glass fiber refrigeration insulation material of 2 inch nominal thickness, and this product was tested against a standard insulation of 3 inch thickness with the following satisfactory result.

Properties of glass fiber refrigeration insulation material

A - std. nominally 3" thickness material
B - experimental insulation made using binder of example X1.

| | A | B |
|---|---|---|
| 1. Recovery | 3.20 | 2.03 |
| 2. Parting strength (lbs./GM) | | |
| (a) Machine direction | | |
| i/ as received | 0.63 | 0.87 |
| ii/ after autoclaving | 0.31 | 0.49 |
| % loss in strength after autoclaving | 50.8 | 43.7 |
| (b) Cross-machine | | |
| i/ as received | 0.71 | 0.77 |
| ii/ after autoclaving | 0.37 | 0.45 |
| % loss in strength after autoclaving | 47.9 | 41.6 |
| 3. Density (pcf) | 1.13 | 1.15 |
| 4. Compressive strength at 25% deformation (psi) | 9.2 | 10.8 |
| 5. Ignition loss (%) | 5.1 | 5.6 |
| | 5.4 | 6.1 |
| 6. Fiber Index (H.T.) | 30.0 | 30.0 |
| | 30.0 | 30.0 |
| 7. Extraction loss (%) | — | 9.8 |
| | | 9.6 |

A batch of calcium catalysed water soluble resin made as described in Example IV (3.5 Moles formaldehyde to 1.0 mols phenol) was compounded into a binder according to the composition and procedure given in example 8–3 in Table VII A.

The product has the following composition by weight on binder solids:

| | % | Parts |
|---|---|---|
| Calcium catalyzed water soluble phenol formaldehyde resin | 48.5 | 54 |
| Urea | 41.3 | 46 |
| Ammonium sulphate | .91 | |
| Silicone | .09 | |
| Mineral Oil | 9.2 | |
| | 100.00 | 100 |

This binder was applied to glass wool which was shaped into a bonded insulation board for use as a roof deck material having a thickness of about 2 inches.

This roof deck material after curing was evaluated according to the normal tests for quality and performance, the results of these are recorded in Table IX. The board was found to be satisfactory.

The standard tests for roof deck material are as follows:

1. Density check (PCF)
2. Compressive strength at 25% deformation (ASTM C-165) (X-head 0.05 inch/min.)
   a. as received
   b. after autoclaving — 15 min at 5 psi. All samples indicated normal compressive properties which coincided accordingly with their respective densities.
3. % swelling after autoclaving — 15 min 5 psi. All samples were within the specification.
4. Ignition loss (%). The samples were all within specification.
5. Extraction loss or degree of cure (%).
6. Fiber diameter (H.T.) hundred thousandths of an inch-organic material burned off fiber (BOF).
7. Water absorption (%) on ASTM method (Fiberglass Canada Ltd. test method No. 9.4).

EXAMPLE XIII

The calcium catalysed water-soluble resin of example V Table I (1 mole phenol to 3.7 mole formaldehyde) was compounded into a binder using the ingredients and procedure of example 8–5. This binder which has the same composition by weight as the binder of Example XII was processed as described in Example XII to produce a roof deck material having a thickness of about 2 inches. This roof deck material after curing was evaluated as described above and found satisfactory. The result of the evaluation is given in Table IX. The results show the roof deck material of Examples 12 and 13 is very good quality.

TABLE IX

EVALUATION OF ROOF DECKING MATERIAL DESCRIBED IN EXAMPLES XII AND XIII USING THE TESTS DESCRIBED IN EXAMPLE XIII

| Tests | Example XII Binder 8-3 Resin Composition as Example IV | Example XIII Binder 8-5a Resin Composition as Example V |
|---|---|---|
| 1. Density (pcf) | 8.8 | 9.2 |
| 2. Compressive strength-deformation at 5% and 25% | | |
| (a) as received 5% | 5.8 | 6.4 |
| 25% | 19.5 | 21.3 |
| (b) after autoclaving and drying | | |
| 5% | 5.1 | 6.4 |
| 25% | 15.2 | 17.5 |
| % loss in strength after autoclaving | 22.8 | 17.8 |
| 3. % swelling after autoclaving | 0.63 | 0.62 |
| 4. Ignition loss (%) | 11.0 | 14.3 |
| 5. Extraction loss (%) | 9.6 | 7.5 |
| 6. Fiber diameter (HT) (BOF) | 62.0 | 62.5 |
| 7. Water absorption (%) 2 tests per board (included membrane) | | |
| 1. | 3.8 | 5.5 |
| 2. | 4.4 | 5.3 |
| Average | 4.1 | 5.4 |

EXAMPLE XIV

The calcium catalysed water soluble resins of Example I (mole ratio 1 mole phenol to 2.8 moles formaldehyde) was compounded into binders using the ingredients and procedures of Examples VIII – I. These binders have the following composition by weight on a solids basis.

| | 8 - 1 wt.% | parts |
|---|---|---|
| Calcium catalysed water soluble phenol formaldehyde | 58.5 | 65 |
| Urea | 31.5 | 35 |
| Ammonium sulphate | .91 | |
| Mineral Oil | 9.0 | |
| Silicone | .09 | |
| | 100.00 | 100 |

These binders were processed into a fiberglass board of about 10 lbs. per cubic foot density using standard manufacturing procedures.

The resulting boards were evaluated according to the standard test methods given and found to be superior when compared to similar board formed using a conventional sodium catalysed phenol formaldehyde resin mole ratio 2.6 moles formaldehyde to 1 Mole Phenol in an equivalent formulation. The results are shown in Table X.

In Table X are shown physical tests on fiber glass boards, nominal density 10pcf when prepared using binder ref. 8–6 of table VII A, based on resin of Example VI as compared to a conventional sodium catalysed resin based binder.

A — Fiber glass board made on binder 8-1 from calcium catalysed resin mole ratio 2.8 Moles formaldehyde to 1.0 Mole Phenol B — Reference std., fiber glass board made on a binder from a conventional sodium catalysed phenolic resin mole 2.6 moles formaldehyde to 1.0 mole phenol.

TABLE X

TESTS ON FIBER GLASS BOARDS

| | A | B |
|---|---|---|
| 1. Density check (pcf) | 9.9 | 8.8 |
| 2. Compressive strength at 25% | | |
| as rec'd (psi) | 24.4 | 17.7 |
| after autoclaving | 19.0 | 13.2 |
| 3. % loss in strength after autoclaving | 22.1 | 25.4 |
| 4. % swelling after autoclaving | 0.28 | 0.70 |
| 5. Ignition loss (%) | 13.6 | 10.5 |
| 6. Extraction (%) | 8.8 | 8.3 |
| 7. Water absorption (%) 2 tests per 12% board includes membrane 1. | 1.1 | 0.9 |

TABLE X-continued

| TESTS ON FIBER GLASS BOARDS | A | B |
|---|---|---|
| 2. | 2.4 | 1.8 |
| AVERAGE | 1.8 | 1.4 |

EXAMPLE XV

The calcium catalysed water soluble resin of Example II (mole ratio 3.1 Moles formaldehyde to 1.0 Mole Phenol) was compounded into the binders with the following composition on a solids basis using the procedure of example 10.

| | A wt% | B wt% |
|---|---|---|
| Calcium catalysed water soluble phenol formaldehyde | 14.5 | 48.71 |
| Alkylated amine co-polymer resin (UCF - 31) | 48.5 | |
| Urea | 6.2 | 25.4 |
| Bone Glue | 29.61 | 24.7 |
| Ammonium sulphate | .99 | .99 |
| Silicone | .2 | .2 |
| | 100.00 | 100.00 |

The above binder compositions suitably adjusted with water were used to manufacture bonded mats of glass wool (tissues) of 10 to 35 mil. thickness. The bone glue component is added as an extender and gelling agent and adhesive.

The mats so prepared were of excellent commercial quality as shown by the test results recorded in Table XI.

TABLE XI

| | Binder A | Binder B |
|---|---|---|
| 1. Tensile strength (lbs)(MD) | 36.3 | 37.3 |
| A. As received | 36.3 | 37.3 |
| B. After autoclaving | 38.0 | 31.1 |
| C. After aging | 40.3 | 36.9 |
| 2. Ignition loss (%) | | |
| 1. | 25.0 | 23.0 |
| 2. | 25.5 | 22.3 |
| AVERAGE | 25.3 | 22.6 |

EXAMPLE XVI

This is an example of the use in glass fibre bonding compositions of the aqueous phenol formaldehyde resins of this disclosure as produced, i.e. without neutralisation of the catalyst prior to storage. Used was selectively calcium catalysed phenol formaldehyde resin of a starting mole ratio of 3.7 moles of formaldehyde to 1 Mole Phenol, of the general type of Example V, but not neutralized with carbon dioxide from pH 8.55 to pH 7.8.

112.4 parts by weight of the above aqueous phenol. formaldehyde solution containing 44.5 weight percent organic solids, or 54 parts of phenol resin solids, were pumped at 50°F. into an agitated vessel and 46 parts by weight of uncoated urea prills were added under agitation until fully dissolved.

This high solids concentrate was combined by means of a set of proportioning pumps with about 1 part (solids) of Ammonium Sulphate in 10% aqueous solution, with 10.0% (solids) of a 50% Mineral Oil emulsion in water, with enough aqueous ammonium to adjust pH from 8.3 to 8.6 and water to adjust to concentration of this binder composition to from 2 to 30% solids.

Where compared to binders containing prior art phenolic resins, and also where compared with the binders as per Example VIII—5 (which contains the Selectively catalysed phenolic resin in its neutralised form), binders prepared by this method and incorporated industrially into glass fibre products exhibit a marked reduction of emission of phenolic pollutants to atmosphere. They exhibit desirable characteristics in the final cure, and increased application efficiencies.

The last mentioned is in agreement with the findings of Study I pertaining to detrimental effects of neutralisation with acids upon cone efficiencies.

TEST METHODS

All tests were carried following standardized test methods as follows:

Free (unreacted) formaldehyde 50 mls. of a hydroxylamine hydrochloride solution (containing 70 grams in one litre of distilled water) are placed in a beaker, and the pH is adjusted to 4 with 1.0 N sodium hydroxide solution, while stirring.

Into a second beaker are weighed 6 ± .01 grams of the resin sample, 15 mls of absolute, formaldehyde free, methanol are added. The content is titrated to pH = 4 with 0.5 N sulphuric acid while stirring.

The adjusted hydroxylamine hydrochloride solution is added to the sample allowed to stand for 5 minutes and the excess titrated back with 1.0 N NaOH to ph = 4. The % free formaldehyde = ½ × ml of 1.0 N NaOH used in final titration.

Resin Solids a. Total Solids

Not less than 2 grams of the resin are placed into a weighed ointment tin, and weighed to 0.001 gram accuracy. Duplicate. To each of the two samples add 10 ml methyl alcohol and place tins and content in a cluster around the thermometer in a gravity type constant temperature oven, without lids. Dehydrate the samples for exactly two (2) hours at 300°F ± 5%. Replace the lids as soon as possible after opening oven door, cool samples in a dessicator to room temperature and weigh.

Calculate total solids: Final Weight/original × 100 =% Total Solids

Accept 0.5% difference between duplicate samples and report as the average of the two.

b. Ash Content

Weigh 10.0 ± 0.1 grams of resin into a weighed platinum (2.5 in. diameter) evaporating dish with cover. Dehydrate in an oven at 300°F for one hour, with lid partly open. Transfer into a controlled temperature muffle furnace at 1000°F for Na or Ba resins or 1600°F for Ca resin, ± 50°F. Allow the dish to remain in furnace overnight, remove, cool in dessicator and weigh residue. Calculate and report as percent $Na_2O$ Ba O or: Ca O c. Organic (Resin) solids: Total Solids — ash = organic solids

Cone Efficiency:

This test is carried out following the method and apparatus for evaluating resin or binder systems as described by A. Simison in U.S. Pat. No. 2,653,473. It serves to determine the percentage of resinous products retained during the application to mineral fibres, in relation to those introduced into the apparatus under conditions closely simulating those experienced in manufacture. The balance represents organics lost by volatilization, which represent potential pollutants.

FREE PHENOL IN PHENOLIC RESIN BY GAS CHROMATOGRAPHY

Suitably diluted samples of phenolic resin are injected into the gas chromatograph and the peak heights compared with those of known concentrations of phenol.

Operating Conditions

1. F & M Gas chromatograph model 5750 equipped with 2 SS columns 6 ft., 10% UC-W-98, 80–100 mesh, T.C. detector.

2. Standard phenol solutions in methanol ranging 1% to 8% in sufficient number of samples to plot an accurate graph based on the peak height.

| | | | |
|---|---|---|---|
| Carrier gas | Helium | Oven Temp. programmed | 110°C to 230°C |
| Flow rate | 30 ml/min. | Programme rate | 15°C/min. |
| Injection Port. Temp. | 350°C | Attenuation | 512 and 8 |
| Detector Temp. | 300°C | | |

Samples are prepared by dilution in methanol to 50% or 25% as convenient. Any precipitate or other solid matter is allowed to settle or is centrifuged and 4 g. of the clear liquid is injected into the G.C. Standard phenol samples must be run and peak heights measured between the corrected baseline and the peak maxima.

$$\% \text{ Phenol in resin} = \frac{\% \text{ phenol standard} \times \text{S.G. of standard } (1.00)}{\text{S.G. of sample}}$$

DETERMINATION OF METHYLOL PHENOLS IN PHENOL-FORMALDEHYDE RESINS BY GAS CHROMATOGRAPHY

SUMMARY

The methylol phenols constituting a significant portion of the water soluble phenol formaldehyde resins cannot be determined by direct gas chromatography because they react on heating to temperatures below their boiling points. It is however possible to replace active hydrogen with Trimethylsilyl groups Si $(CH_3)_3$. The silylized derivatives are chemically stable, and do not condense in the injection part of a gas chromotagraph, thus permitting separation of the eight silylized derivatives of phenol, the methylol phenols and the diphenyls up to 4 substitutions at temperatures up to 310°C.

METHOD

A few drops of P/F resin is mixed with an approximate two-fold excess of Bis (Trimethylsilyl) Trifluoro Acetamide and reacted. This usually takes about 10 mins. helped by slight warming. The resulting product is injected into the G.C.

Using an F & M model 5750 gas chromatograph with thermal conductivity detector:

Column - S.S. 6 foot, 3% SE 30 Ultraphase on Chromosorb W high performance 80.100 mesh Carrier Helium — 30 ml/min.

Injection Port — 300°C

Detector — 300°C

Programme Temperature — 80°–325°C

Sample size — 4

Attenuation — 256–4

The peak heights of eight silylized compounds are measured, totalled and each peak is calculated as a percentage of the whole. The eight peaks used for measuring are those which are the most significant in demonstrating essential differences between resins. The figures representing these groups however do not present absolute percentages within the total structure of the resin, but show a relationship only.

GEL TIME

A brass cup is provided with a heating device suitable for maintaining a constant temperature of 130°C ± 1°C. The sample is placed in the cup and stirred with a glass stirring rod. As the end-point approaches, test pulls may be made by lifting the rod approx. 2 in. out of the sample with quick pulls. The end-point is reached when the pulled thread breaks and "snaps back", showing elasticity. The time is noted and recorded in seconds.

IGNITION LOSS

The ignition loss is determined as weight percent of the wool product. A weighed sample of the material is placed in a muffle oven at 950°F + 25°F. When the organic material has ignited and the sample is uniform in colour throughout, it is cooled to room temperature and weighed and the ignition loss is calculated.

TENSILE STRENGTH

The phenolic resin was combined with urea, ammonium sulphate and silicone, along with microbeads. The mixture was formed in dogbones, (test bars which are thicker at the ends) and cured. One half of the dogbones are broken dry using a Scott tester and the other half were subjected to saturated steam under pressure then tested.

COMPRESSION STRENGTH TEST, LIGHT DENSITY GLASS FIBRE PRODUCTS

The resistance to compression of low density insulating material (below 6 pounds density in pcf) is determined in pounds/square foot at 25% deformation.

DEFORMATION HARDNESS OF HEAVY DENSITY BOARD (Also weight distribution)

Heavy density glass fibre products (density 8–15 pcf) are tested non-destructively by subjecting to a constant load of 10 psi. This method also provides a means of determining weight distribution calculated either as lane weights or lane density. The test equipment employs a 4 inch diameter pressure foot (12.5 square inches).

AUTOCLAVE SWELLING ROOF INSULATION

Roof insulation is tested to determine the percent of swelling after exposure for 15 minutes in a steam autoclave capable of maintaining 5 psi ±½ (225°–228°F). An Ames dial gauge is employed to measure the thickness to the nearest 0.001 inch. The pressure foot on the gauge is ¾ inch in diameter.

MOISTURE ABSORPTION, HUMIDITY CABINET

The moisture pick-up by weight or by volume is determined when subjected to a relative humidity of 95–98% at a temperature of 120°F for 96 hours.

SWELLING OF PIPE INSULATION

The dimensional changes of the pipe insulation is tested by subjection to high humidity conditions. The humidity cabinet used is capable of maintaining a relative humidity of 95% ± 3% at a temperature of 120°F ± 3°F. The samples are measured then left for 96 hours in the humidity cabinet, then wall thickness is remeasured, as is any change in curvature.

WATER ABSORPTION ON GLASS FIBER BASE CAP ROOF INSULATION

This test determines the volume of water that the roof insulation will absorb when submerged. The maximum water absorption rate shall be nominally 3% (max. 12%) by volume in a two hour period as per ASTM G-209.

ANALYSIS FOR DEGREE OF CURE

The percent of uncured binder of the volume products is determined by solvent extraction in a soxhlet apparatus, using acetone as the solvent. To analyse for oil content, hexane is used as the solvent.

HEAT CONDUCTANCE (K VALUE)

K = rate of heat conductance through a homogeneous material expressed in BTU/sq. ft. hr. °F/in. Also called thermal conductivity.

C VALUE (THERMAL CONDUCTANCE)

C = thermal conductance of a non-homogeneous material or one of any thickness other than 1 inch is defined in BTU/sq. ft. hr. °F for a given thickness.

PUNKING TEST

Is the determination of the resistance of the material to smoldering when subjected to a very hot probe. It is usually reported in inches, which is the average diameter of the burned out area.

We claim:

1. A method for making an infinitely dilutable low phenol aqueous solution of thermosettable phenol formaldehyde resin, by selectively catalyzing and controlling the methylolation of phenol with formaldehyde to increase resinification, minimize the content of monomethylol phenols and higher phenyls and maximize the content of o-p-dimethylol phenols, thus producing a resin solution component for binder formulations having low air and wash water-polluting characteristics when applied to a substrate, comprising the steps of:

a. mixing U.S.P. phenol, in the absence of other monomers, with aqueous formaldehyde, in an amount of 3.5 to 4.5 of moles of formaldehyde per mol of phenol, and correspondingly up to about 10 moles of water per mol of the reactants, at a temperature not exceeding about 85°F, and, b. introducing calcium oxide or calcium hydroxide catalyst, with cooling in an amount of 4.9 to 7 percent as calcium (Ca) based upon the weight of phenol, (0.11 mol to 0.16 mol calcium (Ca) per mol of phenol), c. controlling the exothermic rise in the temperature of the reactants without heat input so as to increase to not more than about 125°F during at least the first hour of reaction, d. continuing the methylolation reaction without heat input at a suitable temperature up to 155°F, and e. terminating said reaction by cooling when the condensation reaction product is substantially phenol-free, is still water soluble, and contains between 3 to 16% unreacted formaldehyde.

2. A method as in claim 1 for making infinitely dilutable substantially phenol free aqueous solutions of thermosettable phenol formaldehyde resins, by selectively catalyzing and controlling the methylolation of phenol with formaldehyde to increase resinification, minimize the content of monomethylol phenols and higher phenyls and maximize the content of o-p-dimethylol phenols, thus producing a resin solution component for binder formulations having low air and wash water polluting characteristics when applied to a substrate, comprising the steps of:

a. mixing U.S.P. phenol, in the absence of other monomers, with aqueous formaldehyde in an amount of 3.5 to 4.4 mols of formaldehyde per mol of phenol, and correspondingly from 6 to 10 moles of water per mol of the reactants, at a temperature not exceeding about 85°F, and, b. introducing calcium oxide or calcium hydroxide catalyst with cooling up to or near its solubility limit in the aqueous mixture present, catalyst in an amount of 4.9 to 7 percent as calcium (Ca) based upon the weight of phenol, 0.11 mol to 0.16 mol calcium (Ca) per mol of phenol), c. controlling the exothermic rise in temperature of the reactants without heat input so as to increase to not more than about 125°F during at least the first hour of reaction, d. continuing the methylolation reaction without heat input at a suitable temperature up to 155°F, and e. terminating said reaction by cooling when the condensation reaction product is substantially phenol free, is still water soluble, and contains between 3 to 16 % unreacted formaldehyde.

3. A continuous method as in claim 1 for making infinitely dilutable substantially phenol free aqueous solutions of thermosettable phenol formaldehyde resins, by selectively catalyzing and controlling the methylolation of phenol with formaldehyde to increase resinification, minimize the content of monomethylol phenols and higher phenyls and maximize the content of o-p-dimethylol phenols, thus producing a resin solution component for binder formulations having low air and wash water polluting characteristics when applied to a substrate, comprising the steps of:

a. continuously mixing U.S.P. phenol, in the absence of other monomers, with aqueous formaldehyde in an amount of 3.5 to 4.4 moles of formaldehyde per mol of phenol, and correspondingly from 6 to 10 moles of water per mol of the reactants, continuously introducing calcium oxide or calcium hydroxide catalyst with cooling up to or near its solubility limit in the aqueous mixture present, in an amount of 4.9 to 7 percent as calcium (Ca) based upon the weight of phenol, (0.11 mol to 0.16 mol calcium (Ca) per mol of phenol), while maintaining a temperature of not exceeding about 85°F, b. controlling the exothermic rise in temperature of the reactants without heat input so as to increase to not more than about 125°F during at least the first hour of reaction, c. continuing the methylolation reaction without heat input at a suitable temperature up 155°F, and d. terminating said reaction by cooling when the condensation reaction product is substantially phenol free, is still water soluble, and contains between 3 to 16% unreacted formaldehyde.

4. A method as in claim 1 wherein the formaldehyde is introduced in an amount of 3.5 to 4 mols per mol of phenol and the calcium oxide in an amount of from 0.11 mol to 0.14 mol calcium per mol of phenol.

5. A method as in claim 1, wherein the formaldehyde is introduced in an amount of 3.6 to 3.8 mols per mol of phenol, and the calcium oxide or hydroxide in an amount of from 0.12 mol to 0.13 mol calcium per mol of phenol.

6. A method as in claim 1 wherein the reaction is carried out under subatmospheric pressure, and a reflux condenser is employed to maintain the reagent concentrations.

7. A method as in claim 1 further comprising the step of bringing the reaction product to a pH of 7 to 7.6 by addition of an acid.

8. A method as in claim 7 wherein the acid is chosen from sulfamic, phosphoric, sulfuric, acetic, maleic and carbonic acids, and their ammonium salts.

9. An aqueous solution of a thermosettable phenol formaldehyde condensation resin made according to the method of claim 1.

10. An aqueous solution of a thermosettable phenol formaldehyde condensation resin made according to the method of claim 7.

11. In aqueous thermosettable compositions suitable for bonding, comprising a mixture of aminoplast resins or nonphenolic monomeric materials capable of co-condensing with formaldehyde, a phenol formaldehyde resin, ammonia or a water soluble amine, an acidic curing catalyst, and water, the improvements comprising: the phenol formaldehyde resin is present in the form of an aqueous solution of a thermosettable phenol formaldehyde condensation resin made according to the method of claim 1, the pH of the composition is in the range of about 7 to 9, the acidic catalyst is present in an amount of 0.1 to 2 percent by weight based on the weight of the resin components, and the water is present to a solids content in the range of 1–80 percent by weight.

12. In aqueous thermosettable compositions suitable for bonding, comprising a mixture of aminoplast resins or nonphenolic monomeric materials capable of co-condensing with formaldehyde, a phenol formaldehyde resin, ammonia or a water soluble amine, an acidic curing catalyst, and water, the improvements comprising: the phenol formaldehyde resin is present in the form of an aqueous solution of a thermosettable phenol formaldehyde condensation resin made according to the method of claim 6, the pH of the composition is in the range of about 7 to 9, the acidic catalyst is present in an amount of 0.1 to 2 percent by weight based on the weight of the resin components, and the water is present to a solids content of 1–80 percent by weight.

13. An aqueous bonding composition as in claim 11 where the aminoplast resins are chosen from the group consisting of melamine formaldehyde, urea formaldehyde or alkylated amine formaldehyde copolymer resins, and the co-condensable monomers are chosen from the group consisting of urea, dicyandiamide, melamine, methanol and glycols.

14. A binder composition as in claim 11 wherein the acidic curing catalyst is an ammonium salt of an acid selected from the group consisting of sulfuric acid, phosphoric acid, sulfamic acid, acetic acid, maleic acid and carbonic acid.

15. A binder composition as in claim 11 having a pH in the range of 8.3 to 8.6.

16. A binder composition as in claim 11 wherein the solids content is 2 to 30 percent by weight.

17. A binder as in claim 11 further comprising one or more binder components chosen from the group consisting of coupling agents, emulsified mineral oil, ammonium ligno sulfonate, tall oil, finely divided mineral fillers, animal glue and dyes.

18. A binder as in claim 11 wherein the water soluble amine is chosen from the group consisting of benzylamine, diethylamine, diethanolamine, dimethylamine, ethylamine, methylamine, trimethyl-amine, monoethanolamine, triethanolamine.

19. A binder composition as in claim 13 wherein 50 percent by weight of urea solids are admixed or co-condensed with 50 percent by weight of the phenol formaldehyde resin solids resulting from the selective catalyzation by calcium oxide or hydroxide of 3,5 to 4.0 mols of formladehyde with mol phenol.

20. A binder composition as in claim 13 wherein 46 percent by weight of urea solids are admixed or condensed with 54 percent by weight of phenol formaldehyde resin solids resulting from the selective catalyzation by calcium oxide or hydroxide of 3.5 to 3.7 moles of formaldehyde with 1 mole phenol.

21. A binder composition as in claim 13 wherein 35 percent by weight of urea solids are admixed or co-condensed with 25 percent by weight of an alkylated amine copolymer resin solids and with 40 percent by weight of phenol formaldehyde resin solids resulting from the selective catalyzation by calcium or hydroxide of 3.5 to 3.8 mols of formaldehyde with 1 mol phenol.

22. A binder composition as in claim 13 wherein 5 percent by weight of urea solids are admixed and/or co-condensed with 70 weight percent of alkylated amine copolymer resin solids and with 25 percent by weight of phenol formaldehyde resin solids resulting from the selective catalyzation by calcium oxide or hydroxide of from 3.5 to 3.8 moles of formaldehyde to 1 mol of phenol.

* * * * *